United States Patent
Nakayama et al.

(10) Patent No.: US 12,315,909 B2
(45) Date of Patent: May 27, 2025

(54) POSITIVE ELECTRODE ACTIVE MATERIAL FOR LITHIUM ION SECONDARY BATTERY, METHOD FOR PRODUCING THE SAME, AND LITHIUM ION SECONDARY BATTERY

(71) Applicant: SUMITOMO METAL MINING CO., LTD., Tokyo (JP)

(72) Inventors: Tomoko Nakayama, Niihama (JP); Haruki Kaneda, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 610 days.

(21) Appl. No.: 17/622,401

(22) PCT Filed: Jun. 19, 2020

(86) PCT No.: PCT/JP2020/024253
§ 371 (c)(1),
(2) Date: Dec. 23, 2021

(87) PCT Pub. No.: WO2020/262264
PCT Pub. Date: Dec. 30, 2020

(65) Prior Publication Data
US 2022/0359860 A1    Nov. 10, 2022

(30) Foreign Application Priority Data

Jun. 25, 2019   (JP) ................................. 2019-117934

(51) Int. Cl.
*H01M 4/131* (2010.01)
*C01G 53/00* (2025.01)
(Continued)

(52) U.S. Cl.
CPC ............ *H01M 4/131* (2013.01); *C01G 53/42* (2013.01); *H01M 4/0471* (2013.01);
(Continued)

(58) Field of Classification Search
CPC .... H01M 4/131; H01M 4/0471; H01M 4/364; H01M 4/366; H01M 4/505; H01M 4/525;
(Continued)

(56) References Cited

U.S. PATENT DOCUMENTS

2013/0277604 A1   10/2013  Shimokita et al.
2015/0194673 A1    7/2015  Takagi et al.
(Continued)

FOREIGN PATENT DOCUMENTS

CN   107210441 A    9/2017
CN   107251285 A   10/2017
(Continued)

OTHER PUBLICATIONS

Extended (Supplementary)European Search Report dated Jun. 28, 2023, issued in counterpart EP Application No. 20830997.1. (7 pages).
(Continued)

*Primary Examiner* — Allison Bourke
*Assistant Examiner* — Robert Gene West
(74) *Attorney, Agent, or Firm* — WHDA, LLP

(57) ABSTRACT

The positive electrode active material has high capacity and high output and exhibiting excellent cycle characteristics when being used for a positive electrode of a non-aqueous electrolyte secondary battery. A positive electrode active material for a lithium ion secondary battery contains: a lithium-metal composite oxide containing secondary particles with a plurality of aggregated primary particles; and a compound containing lithium and tungsten present on surfaces of the primary particles. The amount of tungsten contained in the compound containing lithium and tungsten is 0.5 atom % or more and 3.0 atom % or less in terms of a ratio of the number of atoms of W with respect to the total number of atoms of Ni, Co, and an element M, and a
(Continued)

conductivity when the positive electrode active material is compressed to 4.0 g/cm³ as determined by powder resistance measurement is 6×10⁻³ S/cm or less.

15 Claims, 6 Drawing Sheets

(51) Int. Cl.
| | |
|---|---|
| *C01G 53/42* | (2025.01) |
| *H01M 4/04* | (2006.01) |
| *H01M 4/36* | (2006.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC .......... *H01M 4/364* (2013.01); *H01M 4/366* (2013.01); *H01M 4/505* (2013.01); *H01M 4/525* (2013.01); *H01M 10/0525* (2013.01); *C01P 2002/50* (2013.01); *C01P 2004/03* (2013.01); *C01P 2004/51* (2013.01); *C01P 2004/62* (2013.01); *C01P 2004/64* (2013.01); *C01P 2006/10* (2013.01); *C01P 2006/12* (2013.01); *C01P 2006/40* (2013.01); *H01M 2004/021* (2013.01); *H01M 2004/028* (2013.01)

(58) Field of Classification Search
CPC ....... H01M 10/0525; H01M 2004/021; H01M 2004/028; C01G 53/42; C01P 2002/50; C01P 2004/03; C01P 2004/51; C01P 2004/62; C01P 2004/64; C01P 2006/10; C01P 2006/12; C01P 2006/40
USPC ........................................................ 429/223
See application file for complete search history.

(56) References Cited

U.S. PATENT DOCUMENTS

| | | | |
|---|---|---|---|
| 2016/0248091 A1* | 8/2016 | Toya | H01M 4/623 |
| 2016/0293952 A1 | 10/2016 | Kaneda et al. | |
| 2017/0317339 A1 | 11/2017 | Shimokita et al. | |
| 2018/0123118 A1* | 5/2018 | Furuichi | H01M 4/0471 |
| 2018/0226646 A1* | 8/2018 | Furuichi | H01M 4/525 |
| 2018/0287143 A1 | 10/2018 | Ozaki et al. | |
| 2018/0287144 A1 | 10/2018 | Furuichi et al. | |
| 2019/0020023 A1 | 1/2019 | Yokoyama et al. | |
| 2019/0312279 A1* | 10/2019 | Otsuka | H01M 4/525 |
| 2020/0358094 A1 | 11/2020 | Oshita et al. | |

FOREIGN PATENT DOCUMENTS

| | | | | |
|---|---|---|---|---|
| JP | 2002-151071 A | | 5/2002 | |
| JP | 2005-251716 A | | 9/2005 | |
| JP | 2011-108554 A | | 6/2011 | |
| JP | 2013125732 A | * | 6/2013 | |
| JP | 2013-152866 A | | 8/2013 | |
| JP | 2013-239434 A | | 11/2013 | |
| JP | 2015-122298 A | | 7/2015 | |
| WO | 2014/034430 A1 | | 3/2014 | |
| WO | WO-2017018099 A1 | * | 2/2017 | ............ C01G 53/50 |
| WO | 2017/073682 A1 | | 5/2017 | |
| WO | 2018/043515 A1 | | 3/2018 | |
| WO | 2019/039567 A1 | | 2/2019 | |

OTHER PUBLICATIONS

International Search Report dated Sep. 15, 2020, issued in counterpart Application No. PCT/JP2020/024253, with English Translation. (4 pages).
International Preliminary Report on Patentability (Form PCT/IB/373) issued in counterpart International Application No. PCT/JP2020/024253 dated Dec. 28, 2021, with Form PCT/ISA/237. (10 pages).
Office Action dated Nov. 23, 2023, issued in counterpart CN Application No. 202080046463.5, with English translation. (12 pages).

* cited by examiner

POSITIVE ELECTRODE ACTIVE MATERIAL FOR LITHIUM ION SECONDARY BATTERY, METHOD FOR PRODUCING THE SAME, AND LITHIUM ION SECONDARY BATTERY

TECHNICAL FIELD

The present invention relates to a positive electrode active material for a lithium ion secondary battery, a method for producing the same, and a lithium ion secondary battery.

BACKGROUND ART

In recent years, with widespread use of a small information terminal such as a smartphone or a tablet PC, development of a small and lightweight secondary battery having a high energy density has been strongly desired. In addition, development of a secondary battery having high output has also been strongly desired as a battery for an electric car including a hybrid car.

As a secondary battery satisfying such a requirement, a lithium ion secondary battery has been proposed. This lithium ion secondary battery includes a negative electrode, a positive electrode, an electrolyte solution, and the like. As an active material of each of the negative electrode and the positive electrode, a material capable of desorbing and inserting lithium is used.

Such a lithium ion secondary battery is currently actively researched and developed. Particularly, a lithium ion secondary battery using a lithium-metal composite oxide having a layered or spinel type crystal structure as a positive electrode active material can obtain a high voltage of 4 V-class and therefore has been put into practical use as a secondary battery having a high energy density.

Examples of a positive electrode active material that has been proposed mainly so far include a lithium-cobalt composite oxide ($LiCoO_2$) which is relatively easily synthesized, a lithium-nickel composite oxide ($LiNiO_2$) and a lithium-nickel-cobalt-manganese composite oxide ($LiNi_{1/3}Co_{1/3}Mn_{1/3}O_2$) using nickel which is cheaper than cobalt, and a lithium-manganese composite oxide ($LiMn_2O_4$) using manganese.

Among these oxides, a lithium-metal composite oxide containing nickel, such as a lithium-nickel composite oxide or a lithium-nickel-cobalt-manganese composite oxide, has attracted attention as a material having favorable cycle characteristics, low resistance, and high output, and with a need for higher output of a secondary battery in recent years, further reduction in resistance is required.

As one of methods for achieving low resistance in a secondary battery, addition of a different element to a positive electrode active material is known. Particularly, it is useful to add a transition metal which can take a high valence, such as W, Mo, Nb, Ta, or Re.

For example, Patent Literature 1 proposes a positive electrode active material for a non-aqueous secondary battery including a composition formed by at least one compound containing lithium, nickel, cobalt, an element M, niobium, and oxygen. According to this proposal, a positive electrode active material having high thermal stability and large discharge capacity can be obtained because a Li—Nb—O-based compound present near surfaces of particles or inside the particles has high thermal stability.

Patent Literature 2 proposes a positive electrode active material for a non-aqueous electrolyte secondary battery, the positive electrode active material containing a lithium-transition metal composite oxide formed of particles having a polycrystalline structure and obtained by a production method including: a mixing step of mixing a nickel-containing hydroxide, a lithium compound, and a niobium compound having an average particle size of 0.1 to 10 μm to obtain a lithium mixture; and a firing step of firing the lithium mixture at 700 to 840° C. in an oxidizing atmosphere to obtain a lithium-transition metal composite oxide, having a porous structure, having a specific surface area of 0.9 to 3.0 $m^2/g$, and having an alkali metal content other than lithium of 20 ppm by mass or less. This positive electrode active material can achieve high thermal stability, high charge and discharge capacity, and excellent cycle characteristics.

Patent Literature 3 proposes a positive electrode active material for a non-aqueous electrolyte secondary battery, the positive electrode active material containing a lithium-transition metal composite oxide formed of particles having a polycrystalline structure and obtained by a production method including: a niobium coating step of simultaneously adding a niobium salt solution and an acid to a slurry of a nickel-containing hydroxide and controlling the pH of the slurry to be constant within a range of 7 to 11 on the basis of 25° C. to obtain a nickel-containing hydroxide coated with a niobium compound; a mixing step of mixing the nickel-containing hydroxide coated with the niobium compound with a lithium compound to obtain a lithium mixture; and a firing step of firing the lithium mixture at 700 to 830° C. in an oxidizing atmosphere to obtain the lithium-transition metal composite oxide, having a porous structure, and having a specific surface area of 2.0 to 7.0 $m^2/g$. By using this positive electrode active material, a non-aqueous electrolyte secondary battery having high safety, high battery capacity, and excellent cycle characteristics can be obtained.

Patent Literature 4 proposes a positive electrode active material for a non-aqueous electrolyte secondary battery, the positive electrode active material containing at least a lithium-transition metal composite oxide having a layered structure, in which the lithium-transition metal composite oxide is present in a form of particles formed of one or both of primary particles and secondary particles as an aggregate of the primary particles, the primary particles have an aspect ratio of 1 to 1.8, and a compound containing at least one selected from the group consisting of molybdenum, vanadium, tungsten, boron, and fluorine is present on at least surfaces of the particles. By presence of the compound containing at least one selected from the group consisting of molybdenum, vanadium, tungsten, boron, and fluorine on surfaces of the particles, conductivity is improved.

Patent Literature 5 proposes a lithium transition metal-based compound powder for a lithium secondary battery positive electrode material, the lithium transition metal-based compound powder containing a lithium transition metal-based compound capable of inserting and desorbing lithium ions as a main component, and formed by adding one compound containing at least one element selected from the group consisting of B and Bi and one compound containing at least one element selected from the group consisting of Mo, W, Nb, Ta, and Re together to the main component as a raw material, and then firing the resulting mixture. Additive elements are added together, and then the resulting mixture is fired to obtain a lithium transition metal-based compound powder formed of fine particles with suppressed grain growth and sintering, and a lithium-containing transition metal-based compound powder which improves a rate and output characteristics and facilitates handling and preparation of an electrode can be obtained.

Patent Literature 6 proposes a positive electrode composition for a non-aqueous electrolyte solution secondary battery, the positive electrode composition containing a lithium-transition metal composite oxide and a boron compound containing at least a boron element and an oxygen element. By using a positive electrode composition containing a lithium-transition metal composite oxide essentially containing nickel and tungsten and a specific boron compound, output characteristics and cycle characteristics can be improved in the positive electrode composition using the lithium-transition metal composite oxide.

In addition, some proposals have been made to improve output characteristics by forming fine particles containing lithium tungstate on a surface of a lithium-nickel composite oxide.

For example, Patent Literature 7 proposes a positive electrode active material for a non-aqueous electrolyte secondary battery, the positive electrode active material being a lithium-metal composite oxide formed of primary particles represented by a general formula $Li_zNi_{1-x-y}Co_xM_yO_2$ (in which $0.10 \leq x \leq 0.35$, $0 \leq y \leq 0.35$, $0.97 \leq z \leq 1.20$, and M represents at least one element selected from the group consisting of Mn, V, Mg, Mo, Nb, Ti, and Al) and secondary particles with the aggregated primary particles, in which the primary particles of the lithium-metal composite oxide have lithium tungstate fine particles represented by any one of $Li_2WO_4$, $Li_4WO_5$, and $Li6W2O9$ on surfaces thereof. Patent Literature 7 also describes that as for the amount of tungsten contained in the fine particles, the number of atoms of W is 0.1 to 3.0 atom % with respect to the total number of atoms of Ni, Co, and M contained in the lithium-metal composite oxide.

Patent Literature 8 proposes a positive electrode active material for a non-aqueous electrolyte secondary battery, the positive electrode active material being a lithium-metal composite oxide formed of primary particles represented by a general formula $Li_zNi_{1-x-y}Co_xM_yO_2$ (in which $0.10 \leq x \leq 0.35$, $0 \leq y \leq 0.35$, $0.97 \leq z \leq 1.20$, and M represents at least one element selected from the group consisting of Mn, V, Mg, Mo, Nb, Ti, and Al) and secondary particles with the aggregated primary particles, in which the primary particles of the lithium-metal composite oxide have a layered or island-like lithium tungstate compound or a hydrate thereof on surfaces thereof. Patent Literature 8 also describes that in the positive electrode active material, as for the amount of tungsten contained in the lithium tungstate compound, the number of atoms of W is 0.1 to 3.0 mol % with respect to the total number of atoms of Ni, Co, and M contained in the lithium-metal composite oxide.

Patent Literature 9 proposes a positive electrode active material for a non-aqueous electrolyte secondary battery, the positive electrode active material containing lithium-nickel composite oxide particles formed of secondary particles in which a plurality of primary particles is aggregated with each other to form voids therein, having a composition represented by $Li_zN_{1-x-y}CO_xM_yW_aO_{2+\alpha}$ (in which $0 \leq x \leq 0.35$, $0 \leq y \leq 0.35$, $0.95 \leq z \leq 1.30$, $0 < a \leq 0.03$, $0 \leq \alpha \leq 0.15$, and M represents at least one element selected from the group consisting of Mg, Al, Ca, Ti, V, Cr, Mn, Nb, Zr, and Mo), and having a layered crystal structure, in which a lithium-tungsten compound containing tungsten and lithium is present on surfaces of the secondary particles and inside the secondary particles, the lithium-tungsten compound is present on at least a part of surfaces of the primary particles, and the amount of lithium contained in a lithium compound other than the lithium-tungsten compound present on surfaces of the plurality of primary particles is 0.05% by mass or less with respect to the total amount of the lithium-nickel composite oxide particles.

CITATION LIST

Patent Literature

Patent Literature 1: JP 2002-151071 A
Patent Literature 2: JP 2015-122298 A
Patent Literature 3: WO 2014/034430 A
Patent Literature 4: JP 2005-251716 A
Patent Literature 5: JP 2011-108554 A
Patent Literature 6: JP 2013-239434 A
Patent Literature 7: JP 2013-125732 A
Patent Literature 8: JP 2013-152866 A
Patent Literature 9: WO 2017/073682 A

SUMMARY OF INVENTION

Technical Problem

By the way, when short circuit occurs inside a lithium ion secondary battery, heat is generated by a rapid current, and therefore higher thermal stability is required. As one of methods for suppressing a rapid current due to short circuit, reduction in conductivity of a positive electrode active material in a positive electrode is considered to be effective. However, since battery characteristics such as charge and discharge capacity and output characteristics tend to be better as the conductivity of the positive electrode active material is higher, it is difficult to achieve both high battery characteristics and low conductivity.

The above Patent Literatures 1 to 9 do not describe at all an influence on the conductivity of a positive electrode active material in a positive electrode when a transition metal that can take a high valence and contains tungsten or the like is added to a lithium-metal composite oxide.

In view of the above problems, an object of the present invention is to provide a positive electrode active material for a lithium ion secondary battery, the positive electrode active material having high output due to high battery capacity and low positive electrode resistance when being used for a positive electrode of a secondary battery, and having improved resistance to heat generation due to rapid current at the time of short circuit of the secondary battery, that is, improved short circuit resistance characteristics.

Solution to Problem

The present inventors have intensively studied powder characteristics of a lithium-metal composite oxide and an influence on positive electrode resistance of a secondary battery, and have found that it is possible to largely improve the characteristics when the lithium-metal composite oxide is used as a positive electrode of a secondary battery by forming a compound containing lithium and tungsten on surfaces of primary particles forming the lithium-metal composite oxide and controlling the amount of tungsten contained in the compound to a specific amount, thereby completing the present invention.

A first aspect of the present invention provides a positive electrode active material for a lithium ion secondary battery, the positive electrode active material having a mole ratio among lithium (Li), nickel (Ni), cobalt (Co), an element M, and tungsten (W) of Li:Ni:Co:M:W=a:(1−x−y):x:y:z (in which $0 \leq x \leq 0.35$, $0 \leq y \leq 0.35$, $0.005 \leq z \leq 0.030$, $0.97 \leq a \leq 1.25$, and the element M represents at least one element selected from the group consisting of Mn, V, Mg, Mo, Nb, Ti, and Al), in which the positive electrode active material contains: a lithium-metal composite oxide containing secondary particles with a plurality of aggregated primary particles; and a compound containing lithium and tungsten present on surfaces of the primary particles, the amount of tungsten contained in the compound containing lithium and tungsten is 0.5 atom % or more and 3.0 atom % or less in terms of a ratio of the number of atoms of W with respect to the total number of atoms of Ni, Co, and the element M, and a conductivity when the positive electrode active material is compressed to 4.0 g/cm$^3$ as determined by powder resistance measurement is 6×10$^{-3}$ S/cm or less.

In the positive electrode active material, the compound containing lithium and tungsten is preferably present in a form of lithium tungstate. In the positive electrode active material, in scanning electron microscope (SEM) observation, the compound containing lithium and tungsten preferably has a ratio of the number of the secondary particles of 70% or more, the secondary particles being observed on surfaces of the compound containing lithium and tungsten. The positive electrode active material preferably has a specific surface area of 0.2 m$^2$/g or more and 0.8 m$^2$/g or less as measured by a BET method. At least a part of the compound containing lithium and tungsten is preferably present on surfaces of the primary particles as a coating film having a film thickness of 1 nm or more and 200 nm or less. At least a part of the compound containing lithium and tungsten is preferably present on surfaces of the primary particles as fine particles each having a particle size of 1 nm or more and 500 nm or less. The lithium-metal composite oxide preferably has a hexagonal layered structure, and a mole ratio among lithium (Li), nickel (Ni), cobalt (Co), and the element M is preferably represented by Li:Ni:Co:M=b: (1−x−y):x:y:z (in which 0≤x≤0.35, 0≤y≤0.35, 0.95≤b≤1.20, and the element M represents at least one element selected from the group consisting of Mn, V, Mg, Mo, Nb, Ti, and Al). In the positive electrode active material, [(D90−D10)/Mv] calculated by D90 and D10 in a particle size distribution by a laser diffraction scattering method and a volume average particle size (Mv) and indicating a variation index of particle size is preferably 0.80 or more and 1.20 or less, and the volume average particle size (Mv) is preferably 3 μm or more and 15 μm or less.

A second aspect of the present invention provides a method for producing the above positive electrode active material for a lithium ion secondary battery, the method including: stirring a slurry formed by mixing a fired product formed of a lithium-metal composite oxide with water or an aqueous solution; subjecting the slurry to solid-liquid separation to obtain a washed cake containing the lithium-nickel composite oxide; mixing the washed cake with particles of a tungsten-containing compound or a solution of a tungsten-containing compound to obtain a mixture; and subjecting the mixture to a heat treatment.

The fired product preferably has a specific surface area of 1.0 m$^2$/g or more and 2.0 m$^2$/g or less as measured by a BET method.

A third aspect of the present invention provides a lithium ion secondary battery including a positive electrode, a negative electrode, and an electrolyte, in which the positive electrode contains the above positive electrode active material for a lithium ion secondary battery.

Advantageous Effects of Invention

When the positive electrode active material for a lithium ion secondary battery of the present invention is used for a positive electrode of a secondary battery, a lithium ion secondary battery having high output due to high battery capacity and low positive electrode resistance, and having improved short circuit resistance characteristics can be obtained. In addition, the method for producing a positive electrode active material for a lithium ion secondary battery of the present invention can be easily performed even in industrial scale production, and has an extremely high industrial value.

DESCRIPTION OF EMBODIMENTS

Hereinafter, regarding the present invention, first, a positive electrode active material for a lithium ion secondary battery according to the present embodiment will be described, and then a method for producing the same and a lithium ion secondary battery according to the present embodiment will be described.

1. Positive Electrode Active Material for Lithium Ion Secondary Battery

Figure 1A:
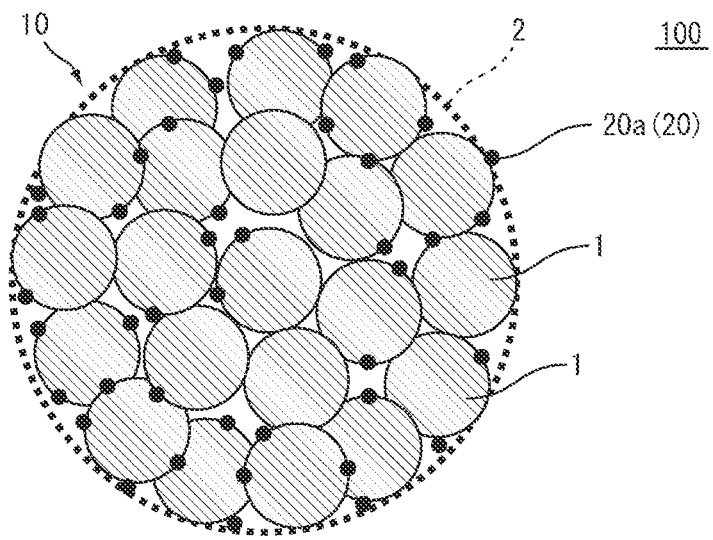
FIGS. 1A to 1C are schematic diagrams illustrating examples of a positive electrode active material according to the present embodiment.
Figure 1B:
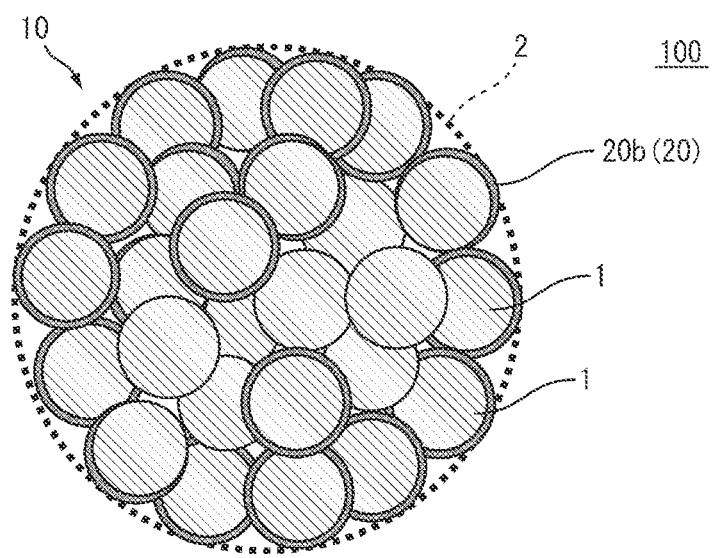
Figure 1C:
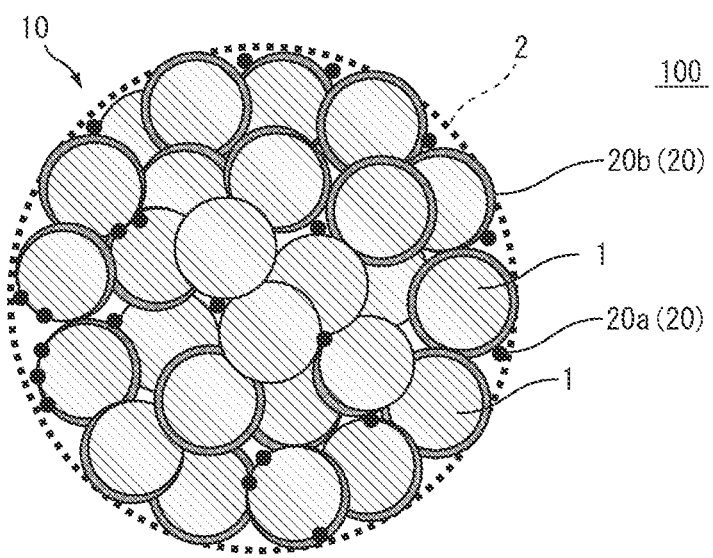

FIGS. 1A to 1C are schematic diagrams illustrating examples of a positive electrode active material for a lithium ion secondary battery according to the present embodiment. Hereinafter, a positive electrode active material 100 according to the present embodiment will be described with reference to FIGS. 1A to 1C.

As illustrated in FIGS. 1A to 1C, the positive electrode active material 100 contains: a lithium-metal composite oxide 10 containing secondary particles 2 with a plurality of aggregated primary particles 1; and a compound containing lithium and tungsten 20 (hereinafter, also simply referred to as "compound 20").

In the positive electrode active material 100, a mole ratio (molar ratio) among lithium (Li), nickel (Ni), cobalt (Co), an element M, and tungsten (W) is represented by Li:Ni:Co:M:W=a:(1−x−y):x:y:z (in which 0≤x≤0.35, 0≤y≤0.35, 0.005≤z≤0.030, 0.97≤a≤1.25, and the element M represents at least one element selected from the group consisting of Mn, V, Mg, Mo, Nb, Ti, and Al). Note that the above mole ratio in the positive electrode active material 100 indicates a mole ratio of the entire positive electrode active material containing the lithium-metal composite oxide 10 and the compound 20.

As illustrated in FIG. 1A, at least a part of the compound 20 may be present on surfaces of the primary particles 1 as fine particles 20a, or as illustrated in FIG. 1B, may be present on the surface of the primary particles 1 as a coating film 20b. In addition, as illustrated in FIG. 1C, the compound 20 may be present on surfaces of the primary particles 1 as both the fine particles 20a and the coating film 20b. Note that the lithium-metal composite oxide 10 may contain, besides the secondary particle 2, the single primary particle 1, or may contain both the single primary particles 1 and the secondary particles 2 with a plurality of aggregated primary particles 1.

The positive electrode active material 100 contains the lithium-metal composite oxide 10 as a base material (core material) to ensure high charge and discharge capacity in a secondary battery, and achieves high battery performance in battery capacity, output characteristics, and short circuit resistance characteristics by the compound 20 formed on surfaces of the primary particles 1 in a specific amount. Hereinafter, each component of the positive electrode active material 100 will be described.

[Lithium-Metal Composite Oxide]

The lithium-metal composite oxide 10 preferably has a hexagonal layered structure, and a mole ratio among lithium (Li), nickel (Ni), cobalt (Co), and the element M is preferably represented by Li:Ni:Co:M=a:(1−x−y):x:y (in which $0 \leq x \leq 0.35$, $0 \leq y \leq 0.35$, $0.95 \leq b \leq 1.20$, and M represents at least one element selected from the group consisting of Mn, V, Mg, Mo, Nb, Ti, and Al). The positive electrode active material 100 contains the lithium-metal composite oxide 10 represented by the above mole ratio as a base material (core material), and can thereby secure high charge and discharge capacity in a secondary battery.

In the above mole ratio, x represents a mole ratio of Co with respect to the total moles of metals other than Li (Ni, Co, and M). A range of x is $0 \leq x \leq 0.35$, and preferably $0 < x \leq 0.35$. By containing cobalt in the positive electrode active material, favorable cycle characteristics can be obtained. The range of x is preferably $0.03 \leq x \leq 0.25$, and more preferably $0.05 \leq x \leq 0.15$ from a viewpoint of achieving both battery capacity and cycle characteristics.

In the above mole ratio, y represents a mole ratio of the element M (additive element) with respect to the total moles of metals other than Li (Ni, Co, and M). M represents at least one element selected from the group consisting of Mn, V, Mg, Mo, Nb, Ti, and Al. A range of y is $0 \leq y \leq 0.35$, preferably $0 < y \leq 0.35$, and more preferably $0 < y \leq 0.10$. By containing M within the above range, durability characteristics and thermal stability of a secondary battery can be improved. When M contains Al, thermal stability of the positive electrode active material is further improved. In the above mole ratio, when an atomic ratio of Al is represented by y1 in a case where the total moles of metals other than Li is 1, y1 may satisfy $0 < y1 \leq 0.1$.

In the above mole ratio, (1−x−y) indicates a mole ratio of Ni with respect to the total moles of metals other than Li (Ni, Co, and M). A range of (1−x−y) is $0.3 \leq (1-x-y) \leq 1.0$. (1−x−y) may be 0.5 or more, 0.7 or more, or 0.8 or more from a viewpoint of high battery capacity. (1−x−y) may be less than 1.0, or 0.95 or less from a viewpoint of improving cycle characteristics and the like.

In the above mole ratio, b represents a mole ratio of Li with respect to the total ($Me^2$) of moles of metals other than Li (Ni, Co, and M) (hereinafter, also referred to as "Li/$Me^2$"). A range of b is $0.95 \leq b \leq 1.20$, and preferably $0.97 \leq b \leq 1.15$. By setting b within the above range, a range of a in the mole ratio of the positive electrode active material 100 can be easily controlled within an appropriate range (0.97 or more and 1.25). Note that in the entire positive electrode active material 100, the Li content in the compound 20 is larger than the lithium content contained in the lithium-metal composite oxide 10, and therefore the value of a is larger than the value of b.

The lithium-metal composite oxide 10 may be represented by, for example, the following general formula (2).

General Formula (2):$Li_bN_{1-x-y}Co_xM_yO_{2+\beta}$ (in which $0 \leq x \leq 0.35$, $0 \leq y \leq 0.35$, $0.95 \leq b \leq 1.20$, $0 \leq \beta \leq 0.5$, and M represents at least one element selected from the group consisting of Mn, V, Mg, Mo, Nb, Ti, and Al)

In the above general formula (2), b, x, and y can be within similar ranges to the mole ratios of the respective elements described above. In the above general formula (2), P represents a coefficient that changes according to the valence of a metal element other than lithium contained in the lithium-metal composite oxide 10 and a mole ratio of lithium with respect to metals element other than lithium.

[Compound Containing Lithium and Tungsten]

In general, when a surface of a positive electrode active material is completely coated with a dissimilar compound, movement (intercalation) of lithium ions is largely limited, and as a result, high battery capacity that is an advantage of the lithium-metal composite oxide 10 is lost.

On the other hand, in the positive electrode active material 100 according to the present embodiment, the compound 20 is formed on surfaces of the primary particles 1. The compound 20 has high lithium ion conductivity and has an effect of promoting movement of lithium ions. Therefore, by forming a specific amount of the compound 20 on surfaces of the primary particles 1, a conduction path of Li is formed at an interface with an electrolyte solution. As a result, reaction resistance (hereinafter, also referred to as "positive electrode resistance") of the positive electrode active material can be reduced.

That is, by reducing the positive electrode resistance, a voltage lost in a battery is reduced, and a voltage actually applied to a load side is relatively increased. Therefore, high output can be obtained. In addition, since the voltage applied to the load side is increased, lithium is sufficiently inserted into and extracted from the positive electrode. Therefore, battery capacity is also improved. Furthermore, since a load of the active material when charging and discharging is also reduced by reducing the reaction resistance, improvement of cycle characteristics can also be expected.

By the way, in a lithium ion secondary battery, when short circuit occurs between a positive electrode and a negative electrode in a charged state, a current rapidly flows to generate large heat. As a result, a chain may occur in which a positive electrode active material is decomposed to further generate heat. In particular, when a combustible non-aqueous electrolyte is used as a constituent material of the lithium ion secondary battery, high thermal stability is required. Therefore, for example, by using a positive electrode active material having low conductivity under a compressed condition in the positive electrode, it is possible to suppress a rapid increase in current caused by short circuit and to improve short circuit resistance characteristics. Meanwhile, when the conductivity of the positive electrode active material at the time of compression is too low, battery characteristics such as battery capacity may be deteriorated.

The positive electrode active material 100 according to the present embodiment can maintain or improve battery characteristics such as high battery capacity originally possessed by the lithium-metal composite oxide 10 and can improve short circuit resistance characteristics by controlling the content, distribution, or the like of the compound 20 within an appropriate range. Hereinafter, the compound 20 will be described in detail.

(Kind)

The compound 20 may be any compound as long as it contains lithium and tungsten, and is preferably, for example, lithium tungstate. When the compound 20 is lithium tungstate, an effect of promoting movement of Li ions is high. The composition of the compound 20 can be confirmed by an X-ray diffraction method (XRD) or the like.

(Amount of Tungsten)

As for the amount of tungsten contained in the compound 20, the ratio of the number of atoms of W with respect to the total number of atoms of Ni, Co, and the element M is 0.5 atom % or more and 3.0 atom % or less, preferably 0.7 atom % or more and 1.7 atom % or less, and more preferably 0.8 atom % or more and 1.3 atom % or less. When the amount of tungsten is within the above range, a sufficient amount of the compound 20 can be formed on surfaces of the primary particles 1 while high battery capacity is ensured, positive electrode resistance can be reduced, and short circuit resistance characteristics can be improved. In addition, the compound 20 can also be formed on surfaces of the primary particles 1 present inside the secondary particles 2, and can efficiently contribute to charge and discharge. Therefore, battery capacity can also be improved.

Meanwhile, when the amount of tungsten contained in the compound 20 is less than 0.5 atom %, the formation amount of the compound 20 is not sufficient, and the conductivity of the positive electrode active material 100 at the time of compression cannot be reduced. When the amount of tungsten contained in the compound 20 exceeds 3.0 atom %, the content of the lithium-metal composite oxide functioning as the positive electrode active material decreases, and an effect of improving battery capacity decreases.

(Number Ratio of Secondary Particles in which Compound is Observed)

When the positive electrode active material 100 is observed with a scanning electron microscope (SEM), the number ratio of the secondary particles 2 on surfaces (surface layers) of which the compound 20 is observed is preferably 70% or more, more preferably 80% or more, and still more preferably 90% or more from a viewpoint of improving short circuit resistance characteristics. When the number ratio of the secondary particles in which the compound 20 is observed is within the above range, short circuit resistance characteristics can be improved by reducing the electron conductivity of the positive electrode active material 100 at the time of compression. Note that the above number ratio refers to the ratio of the number of the secondary particles 2 on surfaces of which the compound 20 is observed with respect to the total number of the observed secondary particles 2.

The number ratio of the secondary particles 2 on surfaces (surface layers) of which the compound 20 is observed is preferably 70% or more and 90% or less, and more preferably 80% or more and 90% or less from a viewpoint of achieving all of high battery capacity, low positive electrode resistance, and short circuit resistance characteristics at a high level.

Figure 6:
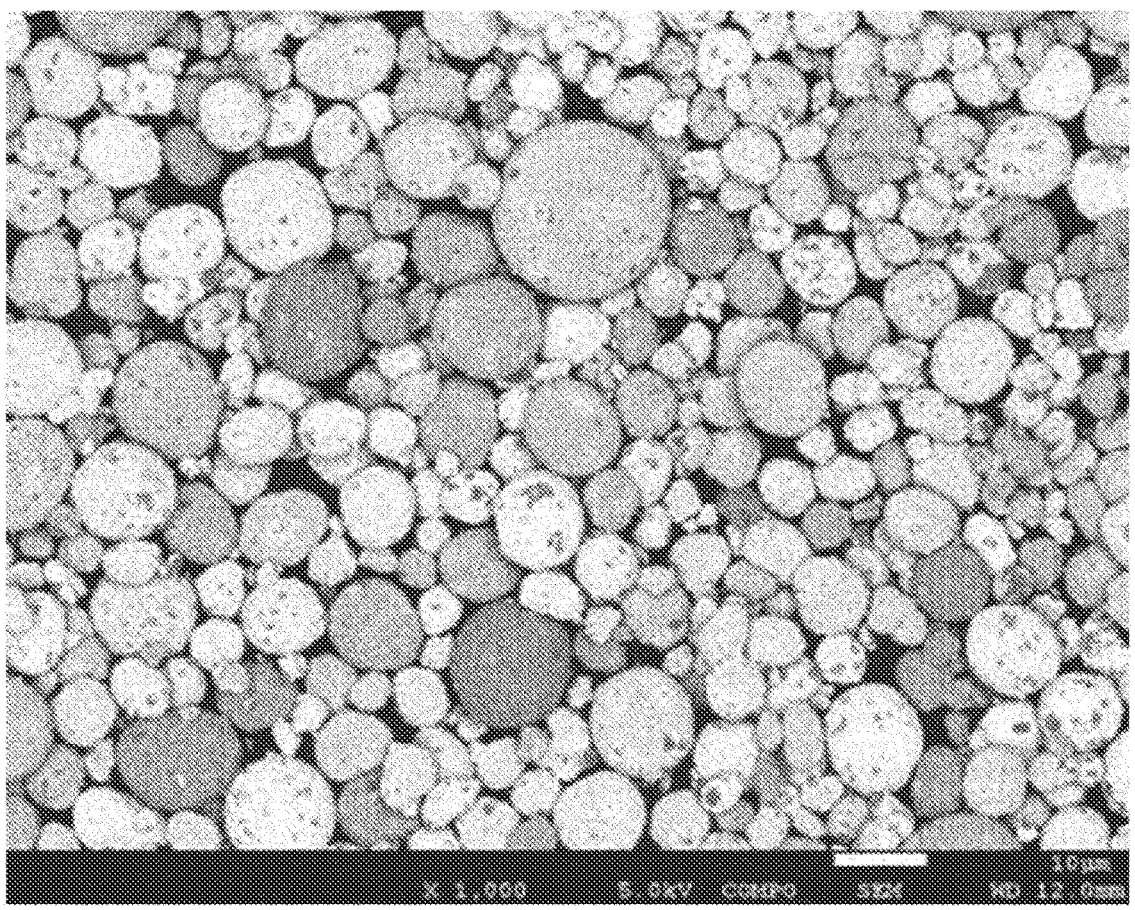
FIG. 6 is a drawing-substituting photograph (magnification: 1,000 times) illustrating an example of an observation result of a lithium-metal composite oxide according to the present embodiment with a scanning electron microscope.

Note that the number ratio of the secondary particles 2 on surfaces (surface layers) of which the compound 20 is observed can be determined by calculating the ratio of the secondary particles 2 on surfaces of which a white site (including a coating film shape and a particulate shape) is observed on 1% or more of the area of the particle surfaces observed among 100 or more secondary particles 2 randomly selected when the positive electrode active material 100 is observed with SEM (see FIG. 6). It can be confirmed by, for example, X-ray diffraction analysis that the white site observed with SEM is the compound 20 containing tungsten and lithium.

The number ratio of the secondary particles 2 on surfaces (surface layers) of which the compound 20 is observed can be controlled within the above range by adjusting the coating amount of the compound 20, a coating method, the specific surface area of the lithium-metal composite oxide 10 used as a base material, and the like described later.

[Form of Compound]

As described above, the compound 20 may be present on surfaces of the primary particles 1 as the fine particles 20a, or may be present on surfaces of the primary particles 1 as the coating film 20b.

Here, the surfaces of the primary particles 1 refer to surfaces of all the primary particles 1 that can be in contact with an electrolyte solution in a secondary battery, and includes, for example, surfaces of the primary particles 1 exposed on outer surfaces of the secondary particles 2, and surfaces of the primary particles 1 exposed in the vicinity of surfaces of the secondary particles 2 which the electrolyte solution can permeate via the outside of the secondary particles 2 and in voids inside the secondary particles 2. Furthermore, the surfaces of the primary particles 1 include a portion in which bonding between the primary particles 1 is incomplete and which the electrolyte solution can permeate even when the portion is a grain boundary between the primary particles 1. The compound 20 is present not only on surfaces of the primary particles 1 exposed on surfaces (outer surfaces) of the secondary particles 2 but also on surfaces of the primary particles 1 exposed in the vicinity of surfaces of the secondary particles 2 which the electrolyte solution can permeate via the outside of the secondary particle 2 and in voids inside the secondary particle 2. As a result, the reaction resistance of the lithium-metal composite oxide 10 can be further reduced.

When at least a part of the compound 20 is formed of the fine particles 20a, a contact area with the electrolyte solution is made sufficient, lithium ion conduction can be effectively improved, battery capacity can be improved, and positive electrode resistance can be further reduced. The particle size of each of the fine particles 20a is preferably 1 nm or more and 500 nm or less. When the particle size is less than 1 nm, fine particles do not have sufficient lithium ion conductivity in some cases. Meanwhile, when the particle size exceeds 500 nm, formation of the fine particles on the surfaces is non-uniform, and a higher effect of reducing reaction resistance cannot be obtained in some cases. Note that all the fine particles 20a do not have to be present as fine particles each having a particle size of 1 nm or more and 500 nm or less, and 50% or more of the number of the fine particles formed on surfaces of the primary particles 1 are preferably formed within a particle size range of 1 nm or more and 500 nm or less.

When at least a part of the compound 20 is formed of the coating film 20b (layered), at least a part of surfaces of the primary particles 1 is coated with the coating film 20b. Therefore, it is possible to form a conduction path of Li at an interface with an electrolyte solution while a decrease in the specific surface area of the positive electrode active material 100 is suppressed, and it is easy to improve short circuit resistance characteristics. The coating film 20b is preferably present on surfaces of the primary particles 1 as a coating having a film thickness of 1 nm or more and 200 nm or less. When the film thickness of the coating film 20b is less than 1 nm, the coating film does not have an effect of sufficiently reducing electron conductivity in some cases.

When the film thickness of the coating film 20b exceeds 200 nm, an effect of reducing reaction resistance is impaired by excessively reducing electron conductivity, and battery capacity may be reduced.

Note that the coating film 20b only needs to be partially formed on surfaces of the primary particles 1, and the entire film thickness of the coating film 20b does not have to be within the range of 1 nm or more and 200 nm or less. The coating film 20b can obtain an effect as long as the coating film 20b having a film thickness of 1 nm or more and 200 nm or less is at least partially formed on surfaces of the primary particles 1. The coating film 20b can easily form a sufficient amount of a coating film having a film thickness of 1 nm or more and 200 nm or less by controlling the amount of tungsten contained in the compound 20 within the above range.

Furthermore, in the compound 20, preferably, the form of the fine particles 20a and the form of the coating film 20b are mixed, and the compound is formed on surfaces of the primary particles 1.

Since a contact between the lithium-metal composite oxides 10 occurs on surfaces of the secondary particles 2, the surfaces of the secondary particles 2 are sufficiently coated with the compound 20. Therefore, an effect of improving short circuit resistance characteristics can be obtained. Meanwhile, as the content of the compound increases, the content of the lithium-metal composite oxide 10 functioning as the positive electrode active material 100 decreases, and battery capacity decreases. Therefore, the formation amount of the compound 20 is preferably an amount sufficient to reduce reaction resistance and improve short circuit resistance, and an amount as small as possible such that battery capacity can be ensured. In the positive electrode active material 100, for example, by adjusting the conductivity at the time of compression within a range described later, it is possible to reduce positive electrode resistance and improve short circuit resistance while maintaining high battery capacity.

For example, when the positive electrode active material 100 is observed with SEM, the number ratio of particles in which 50% or more of surfaces of the secondary particles 2 are coated with the compound 20 (including the fine particles 20a and the coating film 20b) is preferably 50% or more with respect to all the particles observed. When the coating ratio of the entire compound 20 is within the above range within a range in which the positive electrode active material 100 satisfies the above-described amount of tungsten and the above-described number ratio of the secondary particles 2 in which the compound 20 is observed, positive electrode resistance can be reduced and conductivity at the time of compression can be easily reduced while high battery capacity is maintained.

Note that the compound 20 does not need to be formed on the entire surfaces of the primary particles 1 capable of being in contact with an electrolyte solution, and may be in a partially coating state or an interspersed state. When the compound is formed on surfaces of the primary particles 1 capable of being in contact with an electrolyte solution even in a partially coating state or an interspersed state, an effect of reducing reaction resistance can be obtained. When the fine particles 20a or the coating film 20b of the compound 20 is non-uniformly formed between particles of the lithium-metal composite oxide 10, movement of lithium ions between the particles of the lithium-metal composite oxide 10 is non-uniform. Therefore, a load is applied to the specific particles of the lithium-metal composite oxide 10, and deterioration of cycle characteristics and an increase in reaction resistance are likely to occur. Therefore, the compound 20 is preferably formed uniformly to some extent also between the particles of the lithium-metal composite oxide 10.

Note that the properties of surfaces of the secondary particles 2 can be determined, for example, by observation with a field emission scanning electron microscope (FE-SEM), a transmission electron microscope (TEM), or the like.

[Positive Electrode Active Material]

the Positive Electrode Active Material 100 According to the present embodiment contains the lithium-metal composite oxide 10 and the compound 20. Hereinafter, characteristics of the positive electrode active material 100 will be described.

(Composition)

The positive electrode active material 100 contains lithium (Li), nickel (Ni), cobalt (Co), an element M, and tungsten (W) at a mole ratio (molar ratio) of Li:Ni:Co:M:W=a:(1−x−y):x:y:z (in which $0 \leq x \leq 0.35$, $0 \leq y \leq 0.35$, $0.005 \leq z \leq 0.030$, $0.97 \leq a \leq 1.25$, and the element M represents at least one element selected from the group consisting of Mn, V, Mg, Mo, Nb, Ti, and Al). Note that the positive electrode active material 100 may contain a small amount of an element other than the above elements and oxygen.

In the above mole ratio, a represents a mole ratio of Li when the total moles ($Me^1$) of metals other than Li (Ni, Co, and M) is 1 (hereinafter, also referred to as "Li/$Me^1$"), and a range of a is $0.97 \leq a \leq 1.25$, and preferably $0.97 \leq a \leq 1.20$. When a is less than 0.97, positive electrode resistance in a secondary battery using the positive electrode active material 100 is large, and therefore battery output may be low. When a exceeds 1.25, battery capacity of the positive electrode active material 100 may decrease, and positive electrode resistance may increase.

In the above mole ratio, x and y correspond to the mole ratios (x, y) of the elements in the above-described lithium-metal composite oxide 10, and can be within similar ranges to the ranges included in the above-described lithium-metal composite oxide 10. z in the above mole ratio corresponds to the amount of tungsten contained in the above-described compound 20, and can be in a similar range to the amount of tungsten contained in the above-described compound 20.

(Conductivity of Positive Electrode Active Material at the Time of Compression)

An upper limit of conductivity when the positive electrode active material 100 is compressed to 4.0 g/cm$^3$ as determined by powder resistance measurement is $6 \times 10^{-3}$ S/cm or less, and preferably $5 \times 10^{-3}$ S/cm or less. A lower limit of the conductivity is preferably $4 \times 10^{-4}$ S/cm or more, more preferably $7 \times 10^{-4}$ S/cm or more, and still more preferably $1 \times 10^{-3}$ S/cm or more. In a case where the conductivity at the time of compression is within the above range, when a secondary battery is short-circuited, by suppressing a short-circuit current from being conducted and flowing through a surface (surface layer) of the positive electrode active material 100, short circuit resistance characteristics can be improved, and both maintenance of high battery capacity and reduction in positive electrode resistance can be achieved.

Note that the conductivity at the time of compression can be determined, for example, by weighing the positive electrode active material within a range of 4.5 g or more and 5.5 g or less, pressure-molding the positive electrode active material into a cylindrical shape having a diameter of 20 mm under a load of 20 kN (compressing the positive electrode active material to 4.0 g/cm$^3$), and then converting the volume resistivity of the molded body measured in a pressurized state by a resistivity test method using a four-probe method in accordance with JIS K 7194: 1994.

When a secondary battery using the positive electrode active material 100 as a positive electrode is short-circuited, the compound 20 has low electron conductivity, and therefore suppresses a short-circuit current from being conducted and flowing through a surface (surface layer) of the lithium-metal composite oxide 10. Therefore, the conductivity of the positive electrode active material 100 at the time of compression is one of indices reflecting the amount of the compound 20 present on surfaces (surface layers) of all the particles of the lithium-metal composite oxide 10 contained in the positive electrode active material 100. Setting the conductivity at the time of compression within the above range indicates that the compound 20 is present in an amount suitable for improving battery characteristics on surfaces (surface layers) of all the particles of the lithium-metal composite oxide 10.

When the conductivity of the positive electrode active material 100 is set within the above range, the conductivity can be easily controlled within the above range by using a method for producing a positive electrode active material described later. Note that, for example, when a solution of a tungsten-containing compound is mixed with powder of a lithium-metal composite oxide after firing to form the compound 20 on surfaces of the primary particles as in the production methods described in Patent Literatures 7 and 8, the amount of the compound 20 present on surfaces (surface layers) of all the particles of the lithium-metal composite oxide 10 is small. Therefore, it is difficult to sufficiently reduce the conductivity at the time of compression.

(Specific Surface Area)

The specific surface area of the positive electrode active material 100 measured by a BET method is not particularly limited, but is preferably 0.2 m$^2$/g or more and 0.8 m$^2$/g or less. When the specific surface area of the positive electrode active material 100 is within the above range, it is possible to obtain high battery characteristics while suppressing precipitation of a large amount of the compound 20 inside the secondary particles 2, allowing the compound 20 to be sufficiently present on surfaces (surface layers) of the secondary particles 2, and ensuring the short circuit resistance characteristics of the positive electrode active material 100. Note that the specific surface area of the positive electrode active material 100 can be set within the above range by appropriately adjusting the specific surface area of a lithium-metal composite oxide used as a base material, the coating amount of the compound 20, and the like. The specific surface area may be 0.4 m$^2$/g or more, or 0.5 m$^2$/g or more.

(Volume Average Particle Size)

The volume average particle size (Mv) of the positive electrode active material 100 is preferably 3 μm or more and 15 μm or less. In a case where the volume average particle size (Mv) is within the above range, when the positive electrode active material is used for a positive electrode of a secondary battery, it is possible to achieve both high output characteristics and battery capacity and high filling properties to the positive electrode. Meanwhile, when the volume average particle size (Mv) is less than 3 μm, high filling properties to the positive electrode cannot be obtained in some cases. When the volume average particle size (Mv) exceeds 15 μm, high output characteristics and battery capacity cannot be obtained in some cases. Note that the volume average particle size (Mv) can be determined from, for example, a volume integrated value measured with a laser light diffraction/scattering type particle size analyzer.

(Variation Index)

The positive electrode active material 100 preferably has [(D90−D10)/Mv] of 0.80 or more and 1.20 or less. Note that [(D90−D10)/Mv] indicates a variation index of particle sizes of particles constituting the positive electrode active material, the variation index being calculated by D90 and D10 (particle sizes at 90% and 10% in volume integration of particle amounts in a particle size distribution curve) and a volume average particle size (Mv) in a particle size distribution obtained by a laser light diffraction scattering method.

When the particle size distribution of the particles constituting the positive electrode active material is wide, there are many fine particles each having a particle size smaller than the volume average particle size (Mv) and many coarse particles each having a particle size larger than the average particle size. When the variation index is within the above range, fine particles and coarse particles are appropriately mixed, a packing density is increased, and an energy density per volume can be increased. Note that an upper limit of the variation index is not particularly limited, but the upper limit is about 1.20 when a method for producing a positive electrode active material described later is used.

2. Method for Producing Positive Electrode Active Material

Figure 2:
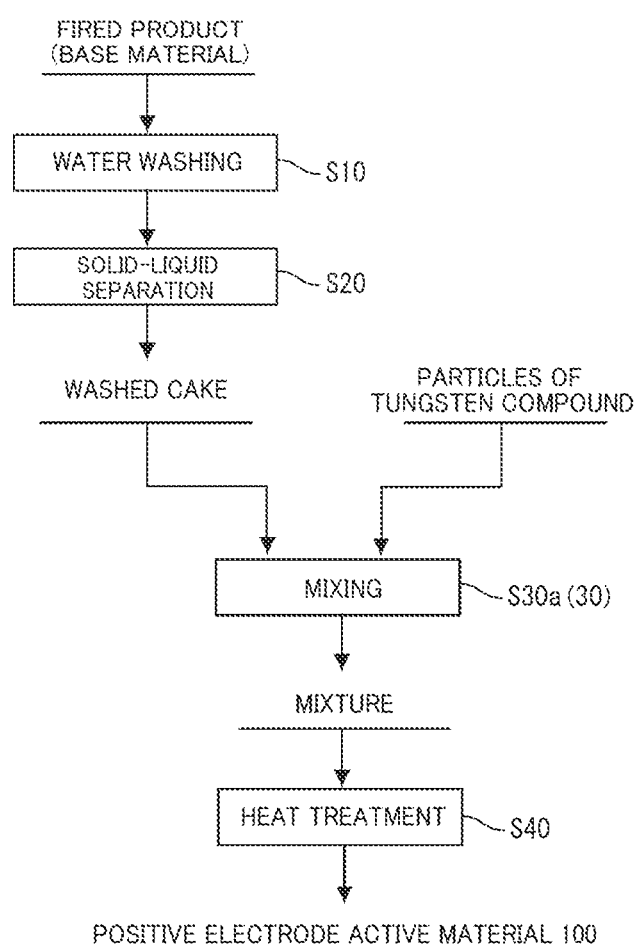
FIG. 2 is a diagram illustrating an example of a method for producing a positive electrode active material according to the present embodiment.
Figure 3:
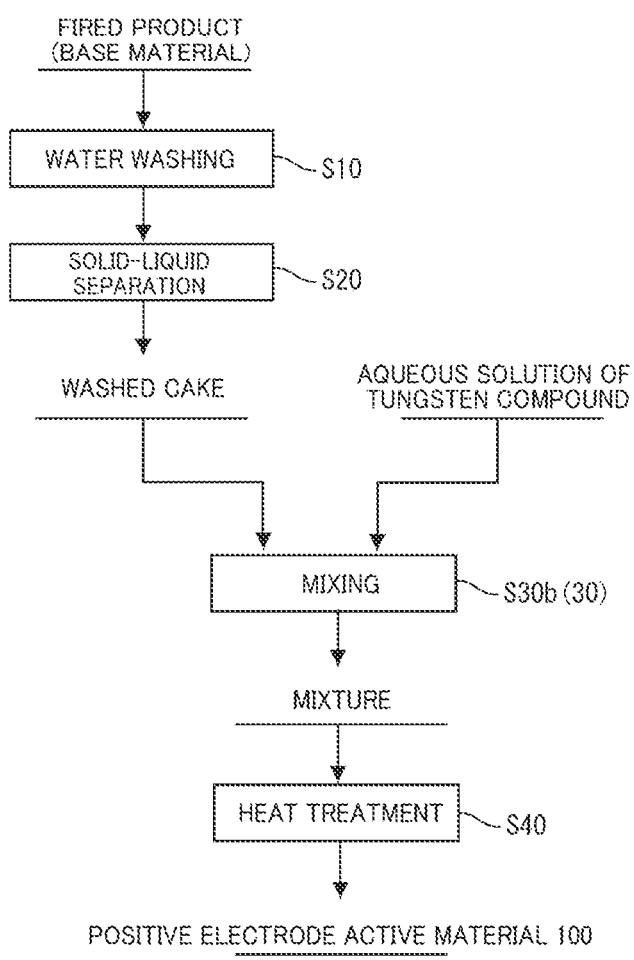
FIG. 3 is a diagram illustrating an example of the method for producing a positive electrode active material according to the present embodiment.

FIGS. 2 and 3 are diagrams illustrating examples of a method for producing a positive electrode active material for a lithium ion secondary battery according to the present embodiment (hereinafter, also referred to as "method for producing a positive electrode active material"). By the production method according to the present embodiment, the positive electrode active material 100 described above can be easily produced on an industrial scale.

The method for producing a positive electrode active material may include, for example, as illustrated in FIG. 2, a water washing step (S10) of cleaning a fired product (base material) made of a lithium-nickel composite oxide with water, a separation step (S20) of performing solid-liquid separation to obtain a washed cake containing the lithium-nickel composite oxide, a mixing step (S30a) of mixing the washed cake with particles of a tungsten-containing compound to obtain a mixture, and a heat treatment step (S40) of subjecting the mixture to a heat treatment.

The method for producing a positive electrode active material may include, for example, as illustrated in FIG. 3, a water washing step (S10) of cleaning a fired product (base material) made of a lithium-nickel composite oxide with water, a separation step (S20) of performing solid-liquid separation to obtain a washed cake containing the lithium-nickel composite oxide, a mixing step (S30b) of mixing the washed cake with an aqueous solution of a tungsten-containing compound to obtain a mixture, and a heat treatment step (S40) of subjecting the mixture to a heat treatment.

Hereinafter, the method for producing a positive electrode active material of the present invention will be described in detail for each step, but the method is not limited as long as the above-described positive electrode active material can be obtained.

[Water Cleaning Step (S10)]

The water washing step (S10) is a step of stirring a slurry formed by mixing a fired product (base material) made of a lithium-nickel composite oxide with water or an aqueous solution. By performing the water washing step (S10), impurities such as excessive lithium containing an unreacted lithium compound and sulfate radicals present on surfaces of primary particles of the fired product (base material) can be removed, and the battery capacity and thermal stability of the positive electrode active material 100 can be improved. In addition, by performing the water washing step (S10), moisture is imparted to the entire surfaces of the primary particles of the fired product (base material), and adhesion of the tungsten-containing compound (hereinafter, also referred to as a "tungsten compound") mixed in the mixing step (S30) to the surfaces of the primary particles 1 is promoted, and the compound 20 can be relatively uniformly formed on the surfaces of the primary particles 1.

The lithium-metal composite oxide used as the base material preferably contains secondary particles with a plurality of aggregated primary particles, and those obtained using a known technique can be used. For example, the fired product (base material) can be obtained by mixing a lithium compound with a nickel composite hydroxide obtained by co-precipitating (crystallizing) a metal element (other than lithium) constituting the lithium-metal composite oxide or a nickel composite oxide obtained by further heat-treating the nickel composite hydroxide (hereinafter, these are also collectively referred to as a "precursor"), and then firing the obtained lithium mixture.

The lithium-metal composite oxide (base material) is a material of the lithium-metal composite oxide 10 contained in the positive electrode active material 100, and the composition thereof is preferably similar to that of the lithium-metal composite oxide 10, and can be adjusted to, for example, general formula (2): $Li_bN_{1-x-y}Co_xM_yO_{2+\beta}$ (in which $0 \le x \le 0.35$, $0 \le y \le 0.35$, $0.95 \le b \le 1.20$, $0 \le \beta \le 0.5$, and M represents at least one element selected from the group consisting of Mn, V, Mg, Mo, Mb, Ti, and Al).

The fired product (base material) preferably has a BET specific surface area of 1.0 m$^2$/g or more and 2.0 m$^2$/g or less after the water washing step (S10). When the specific surface area of the fired product (base material) is within the above range, the specific surface area of the positive electrode active material 100 can be easily adjusted within the above-described preferable range.

The specific surface area of the fired product (base material) can be controlled by conditions for co-precipitating the nickel composite hydroxide (precursor) and firing conditions for mixing and firing the lithium compound. Note that when excessive lithium is present on surfaces of the primary particles, the specific surface area of the fired product (base material) does not indicate a true value in some cases, and therefore the specific surface area of the fired product (base material) obtained after removal of impurities by performing the water washing step (S10) is measured.

Water cleaning only needs to be performed by a known method and under a known condition within a range in which battery characteristics are not deteriorated by excessive elution of lithium from particles of the lithium-metal composite oxide. For example, the slurry concentration of the slurry is preferably 500 g/L or more and 2500 g/L or less, and more preferably 750 g/L or more and 2000 g/L or less. Here, the slurry concentration (g/L) means the mass (g) of the composite oxide particles mixed with 1 L of water. When the slurry concentration is less than 500 g/L, even a lithium compound necessary for a reaction with the tungsten compound and present on surfaces of the lithium-nickel composite oxide particles (base material) is cleaned away, and the reaction between the lithium compound and the tungsten compound in a post-step does not sufficiently proceed in some cases. Meanwhile, when the slurry concentration exceeds 2500 g/L, an excessive unreacted lithium compound and impurity elements may remain to deteriorate battery characteristics.

The water washing temperature is preferably 10° C. or higher and 40° C. or lower, and more preferably 20° C. or higher and 30° C. or lower. Water cleaning time is not particularly limited, but it is preferable to perform water washing in a period of about five minutes or more and 60 minutes or less.

Water or an aqueous solution to be used is not particularly limited, but water having a value of less than 10 μS/cm by electric conductivity measurement is preferable, and water having a value of 1 μS/cm or less by electric conductivity measurement is preferable from a viewpoint of preventing deterioration of battery characteristics due to adhesion of impurities to the positive electrode active material 100. When water washing is performed using an aqueous solution other than water, water washing may be further performed using water thereafter to reduce the amount of impurities contained in the aqueous solution.

[Solid-Liquid Separation Step (S20)]

The solid-liquid separation step (S20) is a step of subjecting a slurry to solid-liquid separation to obtain a washed cake containing the lithium-nickel composite oxide.

A method of solid-liquid separation is not particularly limited, and the solid-liquid separation is performed with a commonly used apparatus by a commonly used method. For example, a suction filter, a centrifuge, a filter press, or the like is preferably used. Solid-liquid separation provides a washed cake containing cleaned composite oxide particles.

The moisture content of the washed cake is preferably 2.0% by mass or more, more preferably 3.0% by mass or more and 15.0% by mass or less, and more preferably 4.5% by mass or more and 11.5% by mass or less. When the moisture content is within the above range, in the heat treatment step (S40) described later, a tungsten compound is dissolved, and tungsten contained in the tungsten compound permeates even voids between the primary particles communicating with the outside of the secondary particles and incomplete grain boundaries together with moisture. As a result, a sufficient amount of tungsten can be dispersed on surfaces of the primary particles.

[Mixing Step (S30)]

The mixing step (S30) is a step of mixing the washed cake with particles of the tungsten compound or a solution of the tungsten compound to obtain a mixture. By performing the mixing step (S30), the tungsten compound permeates the lithium-metal composite oxide (base material). As a result, tungsten can be dispersed on surfaces of the primary particles 1 that can be in contact with an electrolyte solution in the lithium-metal composite oxide 10.

The tungsten compound may be mixed by adding tungsten compound powder to the washed cake as illustrated in FIG. 2, or may be mixed by adding an alkaline solution in which the tungsten compound is dissolved to the washed cake as illustrated in FIG. 3.

In the mixing step (S30), the amount of tungsten added as particles or an aqueous solution of the tungsten compound is preferably the same as the content of tungsten in the obtained positive electrode active material 100. Therefore, the amount of tungsten contained in the tungsten compound is adjusted so as to be preferably 0.5 atom % or more and 3.0 atom % or less, and more preferably 0.7 atom % or more and 1.7 atom % or less in terms of a ratio of the number of atoms of W with respect to the total number of atoms of metal elements other than Li (Ni, Co, and M) contained in the lithium-metal composite oxide (base material). When the amount of tungsten contained in the tungsten compound is within the above range, excessive elution of Li from the lithium-metal composite oxide (base material) can be suppressed, and formation of lithium tungstate having a high effect of promoting movement of Li ions can be promoted.

Note that, for example, Patent Literatures 7 and 8 each describe a method for mixing a solution of a tungsten-containing compound with powder of a lithium-metal composite oxide after firing to form the compound 20 on surfaces of primary particles. However, in these production methods, it is difficult to form the compound 20 on a surface layer so as to sufficiently lower the conductivity of the positive electrode active material at the time of compression. Hereinafter, each mixing step (S30a and S30b) will be described with reference to FIGS. 2 and 3.

(Mixing Step: S30a)

As illustrated in FIG. 2, the mixing step (S30a) is a step of mixing a washed cake with particles of a tungsten-containing compound to obtain a mixture.

In order to cause the particles of the tungsten compound to permeate surfaces of the primary particles inside the secondary particles of the lithium-metal composite oxide (base material), the particles of the tungsten compound are preferably water soluble to such an extent that the particles are dissolved in moisture contained in the washed cake. Since the moisture in the washed cake becomes alkaline by elution of excessive lithium from the lithium-metal composite oxide (base material), the particles of the tungsten compound may be formed of a compound that can be dissolved in an alkaline state.

Since the mixture obtained by performing the mixing step (S30) is heated in the heat treatment step (S40), even if it is difficult to dissolve the mixture in water at normal temperature, the mixture may be dissolved in water by heating during the thermal treatment or may react with a lithium compound present on a surface of the fired product (base material) to form a compound containing lithium and tungsten (for example, lithium tungstate) to be dissolved. Since it is sufficient that there is an amount in which the tungsten compound dissolved in the washed cake can permeate surfaces of the primary particles inside the secondary particles, a part of the tungsten compound may be in a solid state after the mixing step (S30) and further after the heat treatment step (S40). That is, it is sufficient that at least some of particles of the tungsten compound can be dissolved in water at the time of heating in the heat treatment step (S40).

The particles of the tungsten compound may be formed of any compound as long as it has the above characteristics, and for example, are preferably formed of tungsten oxide, tungstic acid, ammonium tungstate, sodium tungstate, lithium tungstate, or the like, and more preferably formed of tungsten oxide ($WO_3$), monohydrate tungstic acid ($WO_3 \cdot H_2O$), or lithium tungstate having a low possibility of contamination with impurities. The particles of the tungsten compound are preferably formed of a compound containing lithium and tungsten, and more preferably formed of lithium tungstate from a viewpoint of suppressing excessive extraction of lithium contained in the lithium-metal composite oxide (base material) when the compound 20 is formed.

It is preferable to mix the washed cake with the particles of the tungsten compound at a temperature of 50° C. or lower. When the temperature is higher than 50° C., the moisture content in the mixture necessary for promoting a reaction between the lithium compound and the tungsten compound cannot be obtained due to drying during mixing in some cases.

When the washed cake is mixed with powder of the tungsten compound, a general mixer can be used. For example, it is only required to perform mixing sufficiently using a shaker mixer, a Loedige mixer, a *Julia* mixer, a V blender, or the like to such an extent that the shape of the lithium-nickel composite oxide is not broken.

(Mixing Step: S30b)

As illustrated in FIG. 3, the mixing step (S30b) is a step of mixing a washed cake with a solution of a tungsten compound to obtain a mixture.

The solution of the tungsten compound is preferably an alkaline solution of the tungsten compound prepared by dissolving the tungsten compound in an alkaline solution. The alkaline solution of the tungsten compound can be prepared, for example, by the following method.

First, a tungsten compound is dissolved in an alkaline solution. A method for dissolving the tungsten compound may be a normal method for dissolving powder. For example, the tungsten compound only needs to be added and dissolved while the solution is stirred using a reaction tank with a stirring apparatus. The tungsten compound is preferably completely dissolved in the alkaline solution from a viewpoint of dispersion uniformity.

The tungsten compound to be added may be any compound as long as it can be dissolved in an alkaline solution, and it is preferable to use a tungsten compound readily-soluble in an alkali, such as tungsten oxide, lithium tungstate, or ammonium tungstate.

As the alkali used for the alkaline solution, it is preferable to use a general alkaline solution not containing impurities harmful to the positive electrode active material 100 in order to obtain high charge and discharge capacity. As the alkali, ammonia and lithium hydroxide that are not likely to be contaminated with impurities can be used, and lithium hydroxide is preferably used from a viewpoint of not inhibiting intercalation of Li.

The alkaline solution is preferably an aqueous solution. In order to disperse tungsten on the entire surfaces of the primary particles, it is necessary to cause the alkaline solution to permeate even voids inside the secondary particles and incomplete grain boundaries. When a highly volatile solvent such as an alcohol is used, the solvent may evaporate before the alkaline solution permeates the voids inside the secondary particles, and the alkaline solution does not sufficiently permeate the voids in some cases.

The pH of the alkaline solution may be any pH as long as the tungsten compound is dissolved in the alkaline solution, but is preferably 9 or more and 12 or less. When the pH is less than 9, the amount of lithium eluted from the lithium-metal composite oxide (base material) may be excessively large, leading to deterioration of battery characteristics. When the pH exceeds 12, the amount of excessive alkali remaining in the lithium-metal composite oxide (base material) may be excessively large, leading to deterioration of battery characteristics.

In the alkaline solution of the tungsten compound, the amount of Li in the alkaline solution is preferably 2.5 or more and 4.0 or less in terms of the ratio of the number of atoms (Li/W) with respect to the W amount in the alkaline solution. Lithium (Li) as a raw material of the compound 20 is also eluted from the lithium-metal composite oxide (base material) and supplied. By adding an alkali containing lithium (for example, lithium hydroxide) so as to fall within this range, a sufficient amount of Li for forming a compound containing lithium and tungsten (for example, lithium tungstate) on surfaces of the primary particles 1 can be supplied. In addition, the amount of lithium contained in the obtained positive electrode active material 100 can be easily adjusted within a range of a (Li/Me$^1$) in the above mole ratio.

In the solution of the tungsten compound, the tungsten concentration calculated by adding the moisture contained in the washed cake to the solution of the tungsten compound is preferably 0.05 mol/L or more and 2 mol/L or less. When the tungsten concentration is less than 0.05 mol/L, the tungsten concentration is low, a large amount of alkaline solution to be mixed is required, and elution of Li due to formation of the slurry may occur. Meanwhile, when the tungsten concentration exceeds 2 mol/L, the liquid amount of the solution of the tungsten compound is small, and tungsten cannot be uniformly dispersed on surfaces of the primary particles in some cases.

The mixing amount of the solution of the tungsten compound only needs to be a liquid amount in which the tungsten compound can be mixed by stirring or the like. For example, the mixing amount calculated by adding the moisture contained in the washed cake to the solution of the tungsten compound is 0.5 ml or more and 150 ml or less, preferably 2 ml or more and 150 ml or less, more preferably 3 ml or more and 100 ml or less, and still more preferably 5 ml or more and 60 ml or less with respect to 100 g of the lithium-metal composite oxide (base material) contained in the washed cake. When the mixing amount of the tungsten compound is within the above range, elution of Li contained in a layered lattice in the lithium-metal composite oxide (base material) can be suppressed, and tungsten can be uniformly dispersed on surfaces of the primary particles.

Meanwhile, when the mixing amount of the solution of the tungsten compound (including the moisture of the washed cake) is less than 0.5 ml with respect to 100 g of the lithium-metal composite oxide (base material), the mixing amount of the solution of the tungsten compound is small in terms of an aqueous solution, and tungsten cannot be uniformly dispersed on surfaces of the primary particles in some cases. When the amount of the solution of the tungsten compound exceeds 150 ml, the amount of the alkaline solution is too large, and a slurry may be formed when the solution of the tungsten compound is mixed with the lithium-metal composite oxide (base material). When a slurry is formed, Li contained in the layered lattice of the lithium-metal composite oxide (base material) is eluted, and the obtained positive electrode active material 100 is likely to deteriorate battery characteristics.

Note that when the obtained mixture is subjected to solid-liquid separation in order to facilitate removal of moisture after the mixing step (S30), the amount of tungsten added is not the same as the amount of tungsten in the obtained positive electrode active material 100, and control of the amount of tungsten in the positive electrode active material 100 is complicated.

The washed cake is mixed with the solution of the tungsten compound preferably at a temperature of 50° C. or lower. The solution of the tungsten compound preferably permeates also voids and grain boundaries of the secondary particles, and is preferably a liquid at the time of mixing. When mixing is performed at a temperature higher than 50° C., the solution of the tungsten compound is quickly dried, and there is a possibility that the solution of the tungsten compound does not sufficiently permeate voids and grain boundaries of the secondary particles. When drying is too early, elution of Li from the lithium-metal composite oxide (base material) cannot be expected, and when Li is not contained in the solution of the tungsten compound, the compound 20 containing lithium is not sufficiently formed on surfaces of the primary particles 1 in some cases.

It is only required to mix the washed cake with the solution of the tungsten compound sufficiently to such an extent that the shape of powder of the lithium-metal composite oxide (base material) is not broken so as to sufficiently disperse tungsten. For mixing, a general mixer can be used as in the mixing step (30a) described above. can be mixed to a degree,

[Heat Treatment Step (S40)]

The drying step (S40) is a step of heat-treating the mixture obtained by performing the mixing step (S30). By performing the heat treatment step (S40), it is possible to obtain the positive electrode active material 100 in which the compound 20 is formed from W supplied from the tungsten compound, Li supplied from particles of the tungsten compound or a solution of the tungsten compound, or Li eluted from the lithium-metal composite oxide (base material), and the compound 20 is formed on surfaces of the primary particles 1 of the lithium-metal composite oxide 10.

Thermal treatment conditions are not particularly limited, but it is preferable to perform heat treatment at a temperature of 100° C. or higher and 250° C. or lower in an oxygen atmosphere or a vacuum atmosphere in order to prevent deterioration of electrical characteristics at the time of use as a positive electrode active material for a lithium ion secondary battery. When the heat treatment temperature is lower than 100° C., moisture is not sufficiently evaporated, and the compound is not sufficiently formed in some cases. Meanwhile, when the heat treatment temperature is higher than 250° C., not only it takes time for drying but also a production apparatus is large in scale, which is not suitable for performing the heat treatment on an industrial scale.

An atmosphere during the thermal treatment is preferably an oxidizing atmosphere such as an oxygen atmosphere or a vacuum atmosphere in order to avoid a reaction with moisture or carbonic acid in the atmosphere.

Heat treatment time is not particularly limited, but is preferably 0.5 hours or more, for example, one hour or more and 24 hours or less at a maximum attainment temperature during the thermal treatment in order to sufficiently evaporate moisture in the mixture to form a sufficient amount of the compound 20.

Before the heat treatment step (S40), a drying step (S35) of performing heat treatment at a lower temperature than that in the heat treatment step (S40) may be performed. The drying step (S35) is a step of removing moisture in the mixture, and can be performed, for example, at 80° C. or higher and 110° C. or lower. When the temperature of the mixture containing moisture is raised, Li eluted from the lithium-metal composite oxide (base material) contained in the mixture may be excessively large. However, by performing the drying step (S35), it is possible to suppress such excessive elution of Li from the lithium-metal composite oxide (base material) and to form an appropriate amount of the compound 20 on surfaces of the primary particles 1.

Note that the above-described production method for forming the compound 20 on surfaces of the primary particles of the lithium-metal composite oxide can be applied not only to the lithium-metal composite oxide having the above-described mole ratio, but also to, for example, a lithium-metal composite oxide such as a lithium cobalt-based composite oxide, a lithium manganese-based composite oxide, or a lithium nickel cobalt manganese-based composite oxide, and further to a generally used positive electrode active material for a lithium secondary battery.

3. Lithium Ion Secondary Battery

The lithium ion secondary battery (hereinafter, also referred to as "secondary battery") according to the present embodiment includes a positive electrode including the positive electrode active material described above, a negative electrode, and a non-aqueous electrolyte. The secondary battery includes, for example, a positive electrode, a negative electrode, and a non-aqueous electrolyte solution. The secondary battery may include, for example, a positive electrode, a negative electrode, and a solid electrolyte. The secondary battery may be any secondary battery which is charged and discharged by desorption and insertion of lithium ions and may be, for example, a non-aqueous electrolyte solution secondary battery or an all-solid-state lithium secondary battery.

Note that the embodiment described below is merely an example, and the secondary battery according to the present embodiment can also be applied to forms subjected to various modifications and improvements based on the embodiment described here.

[Positive Electrode]

A positive electrode of a secondary battery is prepared using the positive electrode active material described above. An example of a method for producing the positive electrode will be described below.

First, the above positive electrode active material, a conductive material, and a binding agent are mixed, activated carbon and a solvent for viscosity adjustment or the like are further added as necessary, and the resulting mixture is kneaded to prepare a positive electrode mixture paste. At this time, a mixing ratio among the components of the positive electrode mixture paste can be appropriately adjusted according to performance of an intended secondary battery. For example, when the solid content of the positive electrode mixture excluding a solvent is 100 mass parts, the content of the positive electrode active material may be 60 mass parts or more and 95 mass parts or less, the content of the conductive material may be 1 mass part or more and 20 mass parts or less, and the content of the binding agent may be 1 mass part or more and 20 mass parts or less.

The obtained positive electrode mixture paste is applied to, for example, a surface of an aluminum foil current collector and dried to scatter the solvent, and a sheet-like positive electrode is thereby prepared. Pressurization may be performed by roll press or the like in order to increase an electrode density as necessary. The sheet-like positive electrode thus obtained can be cut into a proper size according to an intended battery and used in preparation of a battery. However, a method for preparing the positive electrode is not limited to the above-exemplified method, and other methods may be used.

As the conductive material, for example, graphite (natural graphite, artificial graphite, expanded graphite, and the like), and a carbon black-based material such as acetylene black or ketjen black can be used.

The binding agent (binder) plays a role of connecting active material particles together, and for example, polyvinylidene fluoride (PVDF), polytetrafluoroethylene (PTFE), fluororubber, ethylene propylene diene rubber, styrene butadiene, a cellulose-based resin, and polyacrylic acid can be used.

A solvent which disperses the positive electrode active material, the conductive material, and the activated carbon and dissolves the binding agent is added to the positive electrode mixture as necessary. As the solvent, specifically, an organic solvent such as N-methyl-2-pyrrolidone can be used. The activated carbon can be added to the positive electrode mixture in order to increase electric double layer capacity.

[Negative Electrode]

As the negative electrode, metal lithium, a lithium alloy, and the like may be used. In addition, as the negative electrode, a negative electrode may be used which is formed by mixing a binding agent with a negative electrode active material which can occlude and desorb lithium ions, adding an appropriate solvent thereto to form a paste-like negative electrode mixture, coating a surface of a metal foil current collector such as copper with the paste-like negative electrode mixture, drying the coated metal foil current collector, and compressing the resultant metal foil current collector in order to increase an electrode density as necessary.

Examples of the negative electrode active material include natural graphite, artificial graphite, a fired organic compound such as a phenol resin, and a powdery carbon material such as coke. In this case, as the negative electrode binding agent, a fluorine-containing resin such as PVDF can be used as in the positive electrode, and as a solvent for dispersing the active material and the binding agent, an organic solvent such as N-methyl-2-pyrrolidone can be used.

[Separator]

A separator is interposed between the positive electrode and the negative electrode. The separator separates the positive electrode and the negative electrode from each other, retains the electrolyte, and can be known separator. For example, a thin film made of polyethylene, polypropylene, or the like and having a large number of minute pores can be used.

[Non-Aqueous Electrolyte]

As the non-aqueous electrolyte, for example, a non-aqueous electrolyte solution can be used. The non-aqueous electrolyte solution is obtained by dissolving a lithium salt as a supporting salt in an organic solvent. As the non-aqueous electrolyte solution, a solution obtained by dissolving a lithium salt in an ionic liquid may be used. Note that the ionic liquid refers to a salt including a cation other than a lithium ion and an anion and being in a liquid state even at room temperature.

As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly, or two or more of these can be used in mixture.

As the supporting salt, $LiPF_6$, $LiBF_4$, $LiClO_4$, $LiAsF_6$, $LiN(CF_3SO_2)_2$, a composite salt thereof, and the like can be used. Furthermore, the non-aqueous electrolyte solution may contain a radical scavenger, a surfactant, a flame retardant, and the like.

As the non-aqueous electrolyte, a solid electrolyte may be used. The solid electrolyte has a property of withstanding a high voltage. Examples of the solid electrolyte include an inorganic solid electrolyte and an organic solid electrolyte.

Examples of the inorganic solid electrolyte include an oxide-based solid electrolyte and a sulfide-based solid electrolyte.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from the group consisting of lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$ ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ can be used.

The sulfide-based solid electrolyte is not particularly limited, and for example, one that contains sulfur (S) and exhibits lithium ion conductivity and electron insulating property can be suitably used. As the sulfide-based solid electrolyte, for example, one or more selected from the group consisting of $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$ can be used.

Note that, as the inorganic solid electrolyte, an inorganic solid electrolyte other than those described above may be used, and for example, $Li_3N$, $LiI$, $Li_3N$—$LiI$—$LiOH$, and the like may be used.

The organic solid electrolyte is not particularly limited as long as it is a polymer compound exhibiting ionic conductivity, and for example, polyethylene oxide, polypropylene oxide, and copolymers of these can be used. The organic solid electrolyte may contain a supporting salt (lithium salt).

Note that it is also possible to constitute a secondary battery by using a solid electrolyte instead of the non-aqueous electrolyte solution. The solid electrolyte is not decomposed even at a high potential, therefore does not cause gas generation or thermal runaway due to decomposition of the electrolyte solution at the time of charge, observed in a non-aqueous electrolyte solution, and thus exhibits high thermal stability. For this reason, when the positive electrode active material according to the present invention is used for a lithium ion secondary battery, a secondary battery exhibiting higher thermal stability can be obtained.

[Shape and Configuration of Secondary Battery]

The configuration of the secondary battery is not particularly limited, and as described above, the secondary battery may include a positive electrode, a negative electrode, a separator, a non-aqueous electrolyte, and the like, or may include a positive electrode, a negative electrode, a solid electrolyte, and the like. The shape of the secondary battery is not particularly limited, and the secondary battery can be formed into various shapes such as a cylindrical shape and a stacked shape.

For example, when the secondary battery is a non-aqueous electrolyte solution secondary battery, a positive electrode and a negative electrode are stacked with a separator interposed therebetween to form an electrode body, the obtained electrode body is impregnated with a non-aqueous electrolyte solution, a positive electrode current collector is connected to a positive electrode terminal communicating with the outside using a current collecting lead or the like, a negative electrode current collector is connected to a negative electrode terminal communicating with the outside using a current collecting lead or the like, and the resulting product is sealed in a battery case to complete the secondary battery.

Note that the secondary battery according to the present embodiment is not limited to a form in which a non-aqueous electrolyte solution is used as a non-aqueous electrolyte but can be formed into, for example, a secondary battery using a solid non-aqueous electrolyte, that is, an all-solid-state battery. When the secondary battery according to the present embodiment is formed into the all-solid-state battery, the components other than the positive electrode active material can be changed as necessary.

[Battery Characteristics]

A lithium ion secondary battery obtained using the positive electrode active material 100 according to the present embodiment has high battery capacity and low positive electrode resistance, and therefore has high output.

Figure 4:
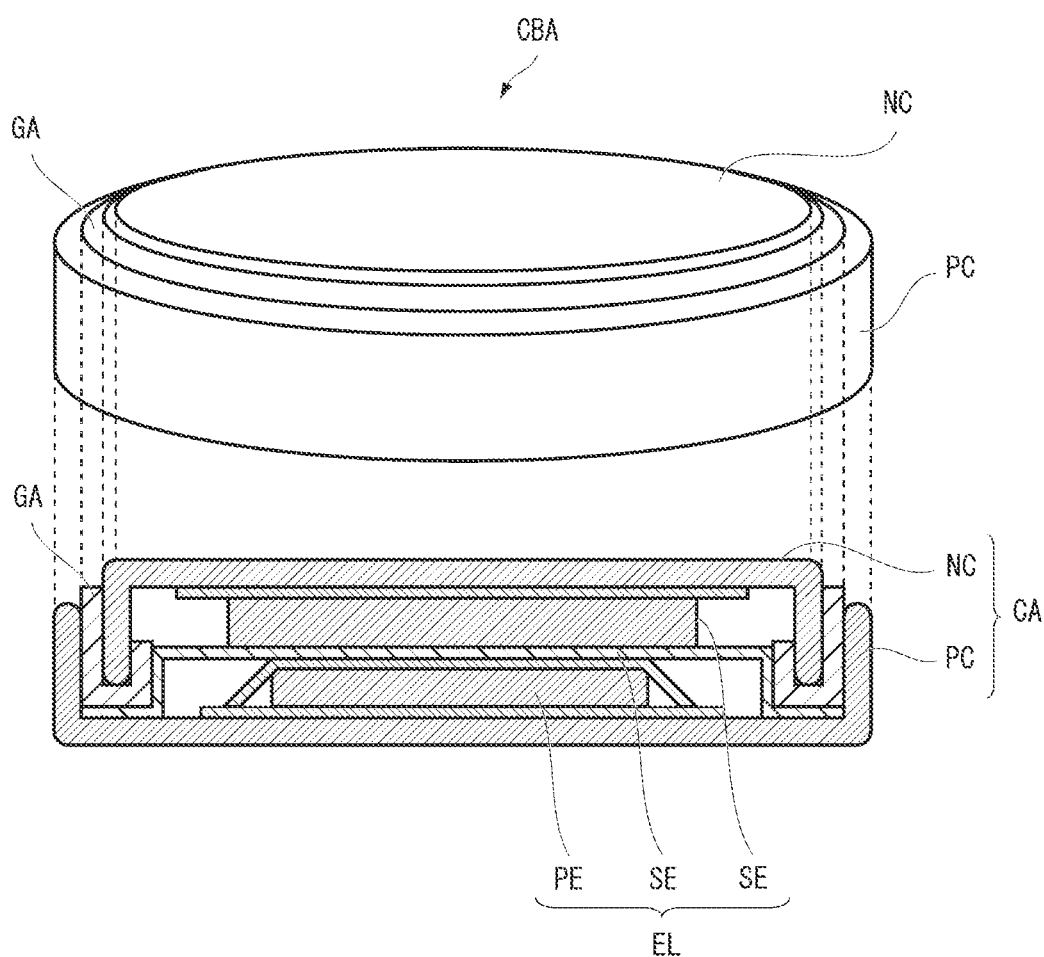
FIG. 4 is a schematic cross-sectional view of a coin type battery used for battery evaluation.

For example, in a 2032 type coin type battery CBA using the positive electrode active material 100 for a positive electrode as illustrated in FIG. 4, initial discharge capacity can be preferably 160 mAh/g or more, more preferably 185 mAh/g or more, more preferably 190 mAh/g or more, and still more preferably 200 mAh/g or more.

In addition, high output can be achieved by reducing positive electrode resistance. As for the positive electrode resistance, for example, high initial discharge capacity of the lithium-metal composite oxide (base material) and low positive electrode resistance are obtained, and higher capacity and higher output are obtained. In addition, it can be said that thermal stability is high and safety is also excellent.

Figure 5:
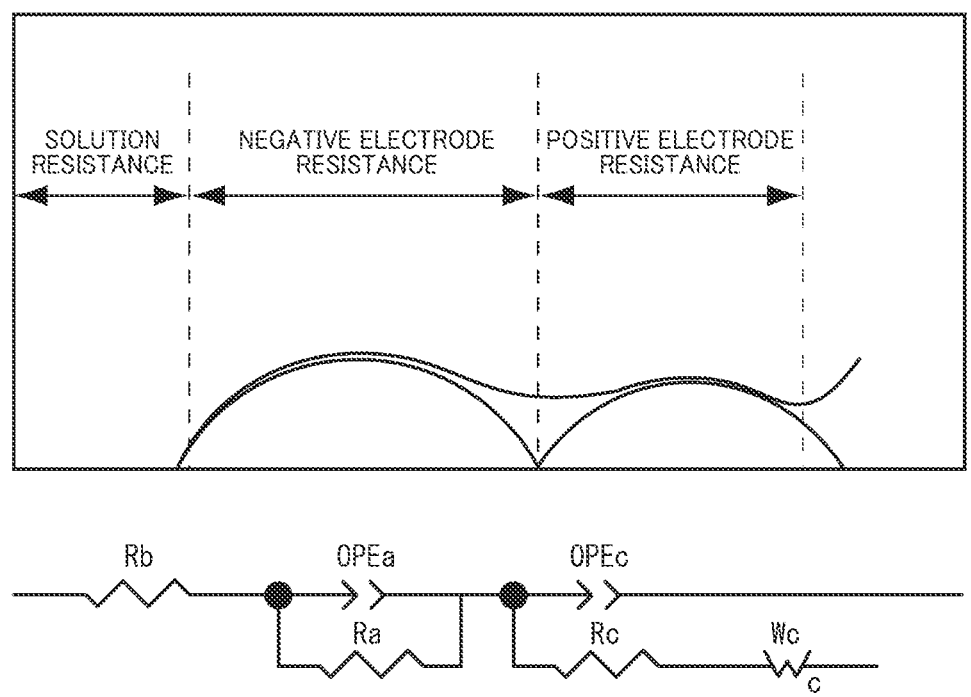
FIG. 5 is an explanatory diagram of an equivalent circuit used for a measurement example and analysis of impedance evaluation.

Note that a method for measuring the positive electrode resistance is exemplified as follows. When frequency dependence of a battery reaction is measured by a general AC impedance method as an electrochemical evaluation method, a Nyquist diagram based on solution resistance, negative electrode resistance, negative electrode capacity, positive electrode resistance, and positive electrode capacity is obtained as illustrated in FIG. 5.

A battery reaction at an electrode includes a resistance component accompanying charge transfer and a capacity component due to an electric double layer. When these are expressed as an electric circuit, the electric circuit is a parallel circuit of resistance and capacity. The entire battery is represented by an equivalent circuit in which solution resistance and a parallel circuit of a negative electrode and a positive electrode are connected in series. Fitting calculation is performed on a Nyquist diagram obtained by measurement using this equivalent circuit, and each resistance component and each capacity component can be estimated. The positive electrode resistance is equal to the diameter of a semicircle on a low frequency side of the obtained Nyquist diagram. From the above, by performing AC impedance measurement on the prepared positive electrode and performing fitting calculation on the obtained Nyquist diagram with an equivalent circuit, the positive electrode resistance can be estimated.

EXAMPLES

Hereinafter, the present invention will be described in more detail with reference to Examples and Comparative Examples of the present invention, but the present invention is not limited to these Examples at all.

Note that methods for analyzing metals contained in positive electrode active materials and various methods for evaluating the positive electrode active materials in Examples and Comparative Examples are as follows. In the present Examples, samples of special grade reagents manufactured by Wako Pure Chemical Industries, Ltd. were used for preparing a positive electrode active material and a secondary battery.

(1) Analysis of composition: Measured by ICP emission spectrometry.

(2) Volume average particle size (Mv) and particle size variation index [(D90–D10)/average volume particle size]: Performed on a volume basis by a laser diffraction scattering type particle size analyzer (Microtrac HRA manufactured by Nikkiso Co., Ltd.).

(3) BET Specific Surface Area

Evaluation was performed using a BET method by nitrogen gas adsorption using a specific surface area measuring apparatus (Quantasorb QS-10 manufactured by Yuasa Ionics Co., Ltd.).

(4) Volume resistivity: 5 g of a positive electrode active material was pressure-molded into a cylindrical shape having a diameter of 20 mm so as to be 4.0 g/cm$^3$, and then the volume resistivity was measured and determined in a pressurized state by a resistivity test method using a four-probe method in accordance with JIS K 7194: 1994.

(Production and Evaluation of Secondary Battery)

For evaluation of a positive electrode active material, a 2032 type coin type battery CBA (hereinafter, referred to as a "coin type battery CBA") illustrated in FIG. 4 was used.

As illustrated in FIG. 4, the coin type battery CBA includes a case CA and an electrode EL housed in the case CA. The case CA includes a positive electrode can PC which is hollow and has one end opened, and a negative electrode can NC disposed in an opening of the positive electrode can PC. When the negative electrode can NC is disposed in the opening of the positive electrode can PC, a space for housing the electrode EL is formed between the negative electrode can NC and the positive electrode can PC.

The electrode EL includes a positive electrode PE, a separator SE, and a negative electrode NE, which are stacked in this order and housed in the case CA such that the positive electrode PE is in contact with an inner surface of the positive electrode can PC and the negative electrode NE is in contact with an inner surface of the negative electrode can NC. Note that the case CA includes a gasket GA, and the gasket GA fixes relative movement of the positive electrode can PC and the negative electrode can NC so as to maintain a state in which the positive electrode can PC and the negative electrode can NC are not in contact with each other. In addition, the gasket GA also has a function of sealing a gap between the positive electrode can PC and the negative electrode can NC to shut off a passage between the inside of the case CA and the outside thereof in an airtight and liquidtight manner. The coin type battery CBA was prepared as follows.

First, 52.5 mg of a positive electrode active material, 15 mg of acetylene black, and 7.5 mg of a polytetrafluoroethylene resin (PTFE) were mixed and press-molded so as to have a diameter of 11 mm and a thickness of 100 μm at a pressure of 100 MPa, thereby preparing a positive electrode PE. This prepared positive electrode PE was dried in a vacuum dryer at 120° C. for 12 hours.

Using the positive electrode PE, a negative electrode NE, a separator SE, and an electrolyte solution, the coin type battery CBA described above was prepared in a glove box having an Ar atmosphere whose dew point was controlled at −80° C.

Note that as the negative electrode NE, a negative electrode sheet obtained by applying graphite powder having an average particle size of about 20 μm and polyvinylidene fluoride to a copper foil, the negative electrode sheet being punched into a disk shape having a diameter of 14 mm, was used, and as the separator SE, a polyethylene porous film having a film thickness of 25 μm was used. As the electrolyte solution, an equal volume mixed solution (manufactured by Toyama Pharmaceutical Co., Ltd.) of ethylene carbonate (EC) and diethyl carbonate (DEC) containing 1 M LiClO$_4$ as a supporting electrolyte was used.

Initial discharge capacity and positive electrode resistance were evaluated as follows.

(Initial Discharge Capacity)

As for initial discharge capacity, capacity was measured when the coin type battery CBA was left for about 24 hours after production thereof to stabilize an open circuit voltage (OCV), then the battery was charged to a cutoff voltage of 4.3 V at a current density of 0.1 mA/cm$^2$ with respect to the positive electrode, the battery paused for one hour, and then the battery was discharged to a cutoff voltage of 3.0 V. Capacity at this time was taken as initial discharge capacity.

(Positive Electrode Resistance)

As for positive electrode resistance, when the coin type battery CBA was charged at a charging potential of 4.1 V and measured by an AC impedance method using a frequency response analyzer and a potentiogalvanostat (1255B manufactured by Solartron), a Nyquist plot illustrated in FIG. 5 was obtained. Since this Nyquist plot is represented as the sum of characteristic curves indicating solution resistance, negative electrode resistance and capacity thereof, and positive electrode resistance and capacity thereof, fitting calculation was performed using an equivalent circuit based on this Nyquist plot, and a value of positive electrode resistance was calculated. Note that positive electrode resistance was evaluated using a relative value with each positive electrode resistance of Example 1 as 100 as an evaluation value.

Example 1

As the base material, lithium-nickel composite oxide particles represented by $Li_{1.025}Ni_{0.88}Co_{0.09}Al_{0.03}O_2$ obtained by a known technique of mixing and firing an oxide containing Ni as a main component and lithium hydroxide. It was confirmed by scanning electron microscope (SEM) observation that the obtained lithium-nickel composite oxide particles were formed of secondary particles with aggregated primary particles and a few non-aggregated and independent primary particles. An average value (volume average particle size) of the lithium-metal composite oxide particles by volume integration in a laser diffraction scattering method was 11.6 μm.

150 mL of pure water at 25° C. was added to 150 g of the base material to form a slurry, and the slurry was cleaned with water for 15 minutes. After water washing, solid-liquid separation was performed by filtration using Nutsche. A washed cake had a moisture content of 7.8%.

Next, 5.3 g of lithium tungstate ($Li_2WO_4$) was added to the washed cake such that the W amount was 1.3 atom % with respect to the total number of atoms of Ni, Co, and Al contained in the lithium-nickel composite oxide, and the resulting mixture was sufficiently mixed using a shaker mixer apparatus (TURBULA TypeT2C manufactured by Willy A. Bachofen (WAB)) to obtain mixed powder. The obtained mixed powder was put in a≤US container, heated to 100° C. for 12 hours and heated to 190° C. for 10 hours using a vacuum dryer, left and dried, and then cooled in a furnace.

Finally, the mixed powder was crushed with a sieve having a mesh size of 38 μm to obtain a positive electrode active material having fine particles of lithium tungstate on surfaces of primary particles.

As a result of analyzing the composition of the obtained positive electrode active material, it was confirmed that a molar ratio of Li:Ni:Co:Al was 1.01:0.88:0.09:0.03, and the content of tungsten was 1.3 atom % with respect to the total number of atoms of Ni, Co, and Al. The specific surface area of the obtained positive electrode active material measured by a BET method was 0.57 m$^2$/g.

[Morphological Analysis of Compound Containing Lithium and Tungsten]

The obtained positive electrode active material was embedded in a resin and subjected to a cross sectional polishing process, and the cross section was observed with SEM at a magnification of 5000 times. As a result, it was confirmed that the positive electrode active material was formed of primary particles and secondary particles with aggregated primary particles, and fine particles of a compound containing lithium and tungsten were formed on surfaces of the primary particles. The fine particles each had a particle size within a range of 30 to 220 nm.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 170 nm was formed on surfaces of the primary particles, and the compound was lithium tungstate.

[Conductivity at the Time of Compression of Powder]

In order to evaluate the electron conductivity of a surface of the positive electrode active material, the conductivity of the surface was measured (Loresta manufactured by Mitsubishi Chemical Analytech Co., Ltd.) while the obtained positive electrode active material was compressed to 3.2 g/cc, and the conductivity was $1.6 \times 10^{-3}$ S/cm.

[Battery Evaluation]

Battery characteristics of the coin type battery CBA illustrated in FIG. 2 having a positive electrode prepared using the obtained positive electrode active material were evaluated. Initial discharge capacity was 206 mAh/g. Hereinafter, in Examples and Comparative Examples, only substances and conditions changed from those in the above Example 1 are described. Evaluation values of initial discharge capacity and positive electrode resistance of these Examples and Comparative Examples are illustrated in Table 1.

Example 2

A positive electrode active material was obtained and evaluated in a similar manner to Example 1 except that 3.0 g of lithium tungstate ($Li_2WO_4$) was added to the washed cake such that the W amount was 0.9 atom % with respect to the total number of atoms of Ni, Co, and Al contained in the lithium-nickel composite oxide.

As a result of analyzing the composition of the obtained positive electrode active material by an ICP method, it was confirmed that a molar ratio of Li:Ni:Co:Al was 1.00:0.88:0.09:0.03, and the content of tungsten was 0.9 atom % with respect to the total number of atoms of Ni, Co, and Al.

As a result of cross-sectional observation with SEM, it was confirmed that fine particles of a compound containing lithium and tungsten and having a particle size of 30 to 220 nm were formed on surfaces of the primary particles.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 140 nm was formed on surfaces of the primary particles, and the compound was lithium tungstate. Evaluation results are collectively illustrated in Table 1.

Example 3

A positive electrode active material was obtained and evaluated in a similar manner to Example 1 except that 2.0 g of lithium tungstate ($Li_2WO_4$) was added to the washed cake such that the W amount was 0.6 atom % with respect to the total number of atoms of Ni, Co, and Al contained in the lithium-nickel composite oxide.

As a result of analyzing the composition of the obtained positive electrode active material by an ICP method, it was confirmed that a molar ratio of Li:Ni:Co:Al was 0.99:0.91:0.06:0.03, and the content of tungsten was 0.6 atom % with respect to the total number of atoms of Ni, Co, and Al.

As a result of cross-sectional observation with SEM, it was confirmed that fine particles of a compound containing lithium and tungsten and having a particle size of 30 to 220 nm were formed on surfaces of the primary particles.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 110 nm was formed on surfaces of the primary particles, and the compound was lithium tungstate. Evaluation results are collectively illustrated in Table 1.

Example 4

A positive electrode active material was obtained and evaluated in a similar manner to Example 1 except that 8.3 g of lithium tungstate ($Li_2WO_4$) was added to the washed cake such that the W amount was 2.5 atom % with respect to the total number of atoms of Ni, Co, and Al contained in the lithium-nickel composite oxide.

As a result of analyzing the composition of the obtained positive electrode active material by an ICP method, it was confirmed that a molar ratio of Li:Ni:Co:Al was 1.04:0.88:0.09:0.03, and the content of tungsten was 2.5 atom % with respect to the total number of atoms of Ni, Co, and Al.

As a result of cross-sectional observation with SEM, it was confirmed that fine particles of a compound containing lithium and tungsten and having a particle size of 40 to 320 nm were formed on surfaces of the primary particles.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 180 nm was formed on surfaces of the primary particles, and the compound was lithium tungstate. Evaluation results are collectively illustrated in Table 1.

Comparative Example 1

A positive electrode active material was obtained and evaluated in a similar manner to Example 1 except that lithium tungstate ($Li_2WO_4$) was not added to the washed cake and the washed cake was dried as it was.

As a result of analyzing the composition of the obtained positive electrode active material by an ICP method, it was confirmed that a molar ratio of Li:Ni:Co:Al was 0.98:0.88:0.09:0.03.

The specific surface area of the positive electrode active material obtained in Comparative Example 1 corresponds to the specific surface area of the base material, and the specific surface area was 1.40 $m^2$/g. Evaluation results are collectively illustrated in Table 1.

Comparative Example 2

A positive electrode active material was obtained and evaluated in a similar manner to Example 1 except that 1.0 g of lithium tungstate ($Li_2WO_4$) was added to the washed cake such that the W amount was 0.3 atom % with respect to the total number of atoms of Ni, Co, and Al contained in the lithium-nickel composite oxide.

As a result of analyzing the composition of the obtained positive electrode active material by an ICP method, it was confirmed that a molar ratio of Li:Ni:Co:Al was 0.99:0.88: 0.09:0.03, and the content of tungsten was 0.3 atom % with respect to the total number of atoms of Ni, Co, and Al.

As a result of cross-sectional observation with SEM, it was confirmed that fine particles of a compound containing lithium and tungsten and having a particle size of 30 to 150 nm were formed on surfaces of the primary particles.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 80 nm was formed on surfaces of the primary particles, and the compound was lithium tungstate. Evaluation results are collectively illustrated in Table 1.

Comparative Example 3

A positive electrode active material was obtained and evaluated in a similar manner to Example 1 except that 19.9 g of lithium tungstate ($Li_2WO_4$) was added to the washed cake such that the W amount was 6.0 atom % with respect to the total number of atoms of Ni, Co, and Al contained in the lithium-nickel composite oxide.

As a result of analyzing the composition of the obtained positive electrode active material by an ICP method, it was confirmed that a molar ratio of Li:Ni:Co:Al was 1.09:0.88: 0.09:0.03, and the content of tungsten was 6.0 atom % with respect to the total number of atoms of Ni, Co, and Al.

As a result of cross-sectional observation with SEM, it was confirmed that fine particles of a compound containing lithium and tungsten and having a particle size of 50 to 580 nm were formed on surfaces of the primary particles.

Furthermore, when the vicinity of surfaces of the primary particles of the obtained positive electrode active material was observed with a transmission electron microscope (TEM), it was confirmed that coating of a compound containing lithium and tungsten with a film thickness of 1 to 190 nm was formed on surfaces of the primary particles, and the compound was lithium tungstate. Evaluation results are collectively illustrated in Table 1.

Comparative Example 41

A positive electrode active material was obtained and evaluated in a similar manner to Example 1 except that lithium tungstate ($Li_2WO_4$) was added without cleaning the lithium-nickel composite oxide with water.

As a result of analyzing the composition of the obtained positive electrode active material by an ICP method, it was confirmed that a molar ratio of Li:Ni:Co:Al was 1.05:0.88: 0.09:0.03, and the content of tungsten was 1.3 atom % with respect to the total number of atoms of Ni, Co, and Al.

As a result of cross-sectional observation with SEM, it was confirmed that fine particles of a compound containing lithium and tungsten and having a particle size of 30 to 550 nm were formed on surfaces of the primary particles. Furthermore, when the vicinity of surfaces of the primary particles of the obtained positive electrode active material was observed with a transmission electron microscope (TEM), coating of a compound containing lithium and tungsten was not confirmed on surfaces of the primary particles. Evaluation results are collectively illustrated in Table 1.

TABLE 1

| | Composition of positive electrode active material [mole ratio] | | | | | Specific surface area [$m^2/g$] | Number ratio of W existing particles [%] | LW compound | | Conductivity at the time of compression of powder [S/cm] | Battery characteristics | |
|---|---|---|---|---|---|---|---|---|---|---|---|---|
| | Li a | Ni 1-x-y | Co x | Al y | W/Ni + C0 + Al [Atom %] | | | Particle size [nm] | Film thickness [nm] | | Initial discharge capacity [mAh/g] | Positive electrode resistance — |
| Example 1 | 1.01 | 0.88 | 0.09 | 0.03 | 1.3 | 0.57 | 90 | 30-220 | 1-140 | $1.6 \times 10^{-3}$ | 206.1 | 100 |
| Example 2 | 1.00 | 0.88 | 0.09 | 0.03 | 0.9 | 0.79 | 85 | 30-220 | 1-140 | $2.5 \times 10^{-3}$ | 206.5 | 98 |
| Example 3 | 0.99 | 0.88 | 0.09 | 0.03 | 0.6 | 0.68 | 80 | 30-220 | 1-110 | $4.9 \times 10^{-3}$ | 206.8 | 96 |
| Example 4 | 1.03 | 0.88 | 0.09 | 0.03 | 2.5 | 0.53 | 90 | 40-320 | 1-180 | $4.9 \times 10^{-4}$ | 197.0 | 106 |
| Comparative Example 1 | 0.98 | 0.88 | 0.09 | 0.03 | 0.0 | 1.40 | 0 | — | — | $6.9 \times 10^{-2}$ | 207.4 | 171 |
| Comparative Example 2 | 0.99 | 0.88 | 0.09 | 0.03 | 0.3 | 0.91 | 65 | 30-150 | 1-80 | $1.0 \times 10^{-2}$ | 207.6 | 95 |
| Comparative Example 3 | 1.09 | 0.88 | 0.09 | 0.03 | 6.0 | 0.91 | 95 | 50-580 | 1-190 | $2.2 \times 10^{-4}$ | 185.2 | 130 |
| Comparative Example 4 | 1.05 | 0.88 | 0.09 | 0.03 | 1.3 | 0.55 | 20 | 30-550 | — | $1.8 \times 10^{-2}$ | 205.8 | 162 |

[Evaluation]

As is apparent from Table 1, the positive electrode active materials of Example 1 to 4 were produced according to the present invention, and therefore each have higher initial discharge capacity, lower positive electrode resistance, and lower conductivity of a powder surface than those of Comparative Examples, and are batteries having excellent characteristics.

FIG. 6 illustrates an example of SEM observation result of a positive electrode active material obtained in Examples of the present invention, and it was confirmed that the obtained positive electrode active material was formed of primary particles and secondary particles with aggregated primary particles, lithium tungstate (white coating film) was present on surface layers of the secondary particles, and fine particles of lithium tungstate were formed on surfaces of the primary particles.

In Comparative Example 1, since the fine particles of lithium tungstate according to the present invention were not formed on surfaces of the primary particles, positive electrode resistance and the conductivity of the powder were significantly high, and it is difficult to satisfy a requirement for high output and short circuit resistance characteristics.

In Comparative Example 2, since the amount of tungsten added was small, formation of a compound containing lithium and tungsten was small, and positive electrode resistance was low, but conductivity was high, and it is insufficient to satisfy a requirement for short circuit resistance characteristics.

In Comparative Example 3, since the amount of tungsten added was large, it is considered that a compound containing lithium and tungsten was excessively formed, and the conductivity of the powder was low, but discharge capacity was low, positive electrode resistance was also high, and battery characteristics were deteriorated.

In Comparative Example 4, powder containing no moisture was mixed, formation of a coating film was not confirmed on a surface of the positive electrode active material, the ratio of particles to which a compound containing lithium and tungsten was attached was low, positive electrode resistance and the conductivity of the powder were high, and it is difficult to satisfy a requirement for higher output and short circuit resistance characteristics.

INDUSTRIAL APPLICABILITY

The non-aqueous electrolyte secondary battery of the present invention is suitable for a power source of a small portable electronic device (such as a notebook personal computer or a mobile phone terminal) that is required to have high capacity all the time, and is also suitable for a battery for an electric car that is required to have high output.

In addition, the non-aqueous electrolyte secondary battery of the present invention has excellent safety, and can be reduced in size and increased in output, and is therefore suitable as a power source for an electric car that is restricted in mounting space. Note that the present invention can be used not only as a power source for an electric car driven purely by electric energy but also as a power source for a so-called hybrid car used together with a combustion engine such as a gasoline engine or a diesel engine.

Note that the technical scope of the present invention is not limited to the aspects described in the above embodiment and the like. One or more of the requirements described in the above embodiment and the like may be omitted. The requirements described in the above embodiment and the like can be combined as appropriate. To the extent permitted by law, the disclosure of Japanese Patent Application No. 2019-117934, which is a Japanese patent application, and all the literatures cited in the above embodiment and the like are incorporated as part of the description of this text.

REFERENCE SIGNS LIST

CBA Coin type battery (for evaluation)
PE Positive electrode (electrode for evaluation)
NE Negative electrode
SE Separator
GA Gasket
WW Wave washer
PC Positive electrode can
NC Negative electrode can
G Void

The invention claimed is:

1. A positive electrode active material for a lithium ion secondary battery, the positive electrode active material having a mole ratio among lithium (Li), nickel (Ni), cobalt (Co), an element M, and tungsten (W) of Li:Ni:Co:M:W=a:(1−x−y):x:y:z (in which $0 \leq x \leq 0.35$, $0 \leq y \leq 0.35$, $0.005 \leq z \leq 0.030$, $0.97 \leq a \leq 1.25$, and the element M represents at least one element selected from the group consisting of Mn, V, Mg, Mo, Nb, Ti, and Al), wherein
the positive electrode active material comprises: a lithium-metal composite oxide which comprises primary particles and secondary particles formed of a plurality of the primary particles which are aggregated together; and a compound containing lithium and tungsten present on surfaces of the primary particles,
an amount of tungsten contained in the compound containing lithium and tungsten is 0.5 atom % or more and 3.0 atom % or less in terms of a ratio of a number of atoms of W with respect to a total number of atoms of Ni, Co, and the element M, and
a conductivity when the positive electrode active material is compressed to 4.0 g/cm$^3$ as determined by powder resistance measurement is 6×10$^{-3}$ S/cm or less.

2. The positive electrode active material for a lithium ion secondary battery according to claim 1, wherein the compound containing lithium and tungsten is present in a form of lithium tungstate.

3. The positive electrode active material for a lithium ion secondary battery according to claim 1, wherein the compound containing lithium and tungsten is present on surfaces of the secondary particles observed by a scanning electron microscope (SEM), and 70% or more of a total number of the secondary particles observed by the SEM have the compound containing lithium and tungsten on the surfaces.

4. The positive electrode active material for a lithium ion secondary battery according to claim 1, wherein the positive electrode active material has a specific surface area of 0.2 m$^2$/g or more and 0.8 m$^2$/g or less as measured by a BET method.

5. The positive electrode active material for a lithium ion secondary battery according to claim 1, wherein at least a part of the compound containing lithium and tungsten is present on surfaces of the primary particles as a coating film having a film thickness of 1 nm or more and 200 nm or less.

6. The positive electrode active material for a lithium ion secondary battery according to claim 5, wherein at least a part of the compound containing lithium and tungsten is present on surfaces of the primary particles each having a particle size of 1 nm or more and 500 nm or less.

7. The positive electrode active material for a lithium ion secondary battery according to claim 1, wherein the lithium-metal composite oxide has a hexagonal layered structure, and a mole ratio among lithium (Li), nickel (Ni), cobalt (Co), and the element M is represented by Li:Ni:Co:M=b:(1−x−y):x:y (in which $0 \leq x \leq 0.35$, $0 \leq y \leq 0.35$, $0.95 \leq b \leq 1.20$, and the element M represents at least one element selected from the group consisting of Mn, V, Mg, Mo, Nb, Ti, and Al).

8. The positive electrode active material for a lithium ion secondary battery according to claim 1, wherein [(D90−D10)/Mv] calculated by D90 and D10 in a particle size distribution by a laser diffraction scattering method and a volume average particle size (Mv) and indicating a variation index of particle size is 0.80 or more and 1.20 or less, and the volume average particle size (Mv) is 3 μm or more and 15 μm or less.

9. A method for producing the positive electrode active material for a lithium ion secondary battery according to claim 1, the method comprising:
- stirring a slurry formed by mixing a fired product formed of a lithium-metal composite oxide with water or an aqueous solution to clean the slurry with water;
- subjecting the slurry to solid-liquid separation to obtain a washed cake containing the lithium-nickel composite oxide; mixing the washed cake with particles of a tungsten-containing compound or a solution of a tungsten-containing compound to obtain a mixture; and
- subjecting the mixture to a heat treatment.

10. The method for producing a positive electrode active material for a lithium ion secondary battery according to claim 9, wherein the fired product has a specific surface area of 1.0 m²/g or more and 2.0 m²/g or less as measured by a BET method.

11. A lithium ion secondary battery comprising a positive electrode, a negative electrode, and an electrolyte, wherein the positive electrode contains the positive electrode active material for a lithium ion secondary battery according to claim 1.

12. The positive electrode active material for a lithium ion secondary battery according to claim 1, wherein the compound containing lithium and tungsten is present on surfaces of the secondary particles observed by a scanning electron microscope (SEM), and 70% or more and 90% or less of a total number of the secondary particles observed by the SEM have the compound containing lithium and tungsten on the surfaces.

13. The positive electrode active material for a lithium ion secondary battery according to claim 1, wherein the secondary particles have such a coating area ratio that 50% or more of the surfaces of the secondary particles are coated with the compound containing lithium and tungsten, and 50% or more of a total number of the secondary particles observed by a scanning electron microscope (SEM) have the coating area ratio.

14. The positive electrode active material for a lithium ion secondary battery according to claim 1, wherein the conductivity when the positive electrode active material is compressed to 4.0 g/cm³ is $4\times10^{-4}$ S/cm or more and $6\times10^{-3}$ S/cm or less.

15. The positive electrode active material for a lithium ion secondary battery according to claim 1, wherein the conductivity when the positive electrode active material is compressed to 4.0 g/cm³ is $1\times10^{-3}$ S/cm or more and $6\times10^{-3}$ S/cm or less.

* * * * *